Sept. 24, 1957  W. S. TANDLER ET AL  2,807,175
ROTARY INDEXING MECHANISM
Filed Dec. 31, 1952  6 Sheets-Sheet 1

INVENTOR.
W. S. Tandler et al.
BY
Campbell, Brumbaugh,
Free and Graves

Sept. 24, 1957  W. S. TANDLER ET AL  2,807,175
ROTARY INDEXING MECHANISM
Filed Dec. 31, 1952  6 Sheets-Sheet 2

INVENTOR.
W.S. Tandler et al.
BY
Campbell, Brumbaugh
Free and Graves

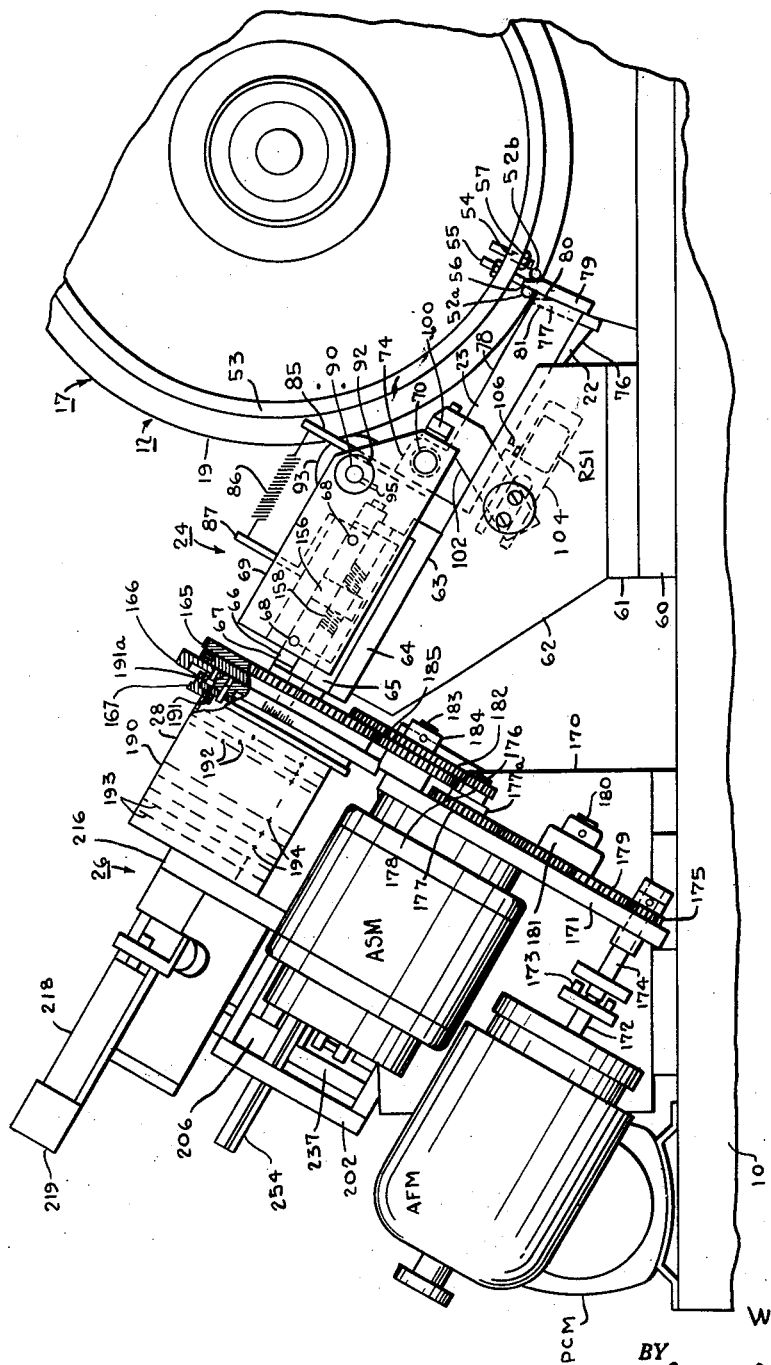

Sept. 24, 1957  W. S. TANDLER ET AL  2,807,175
ROTARY INDEXING MECHANISM
Filed Dec. 31, 1952  6 Sheets-Sheet 4
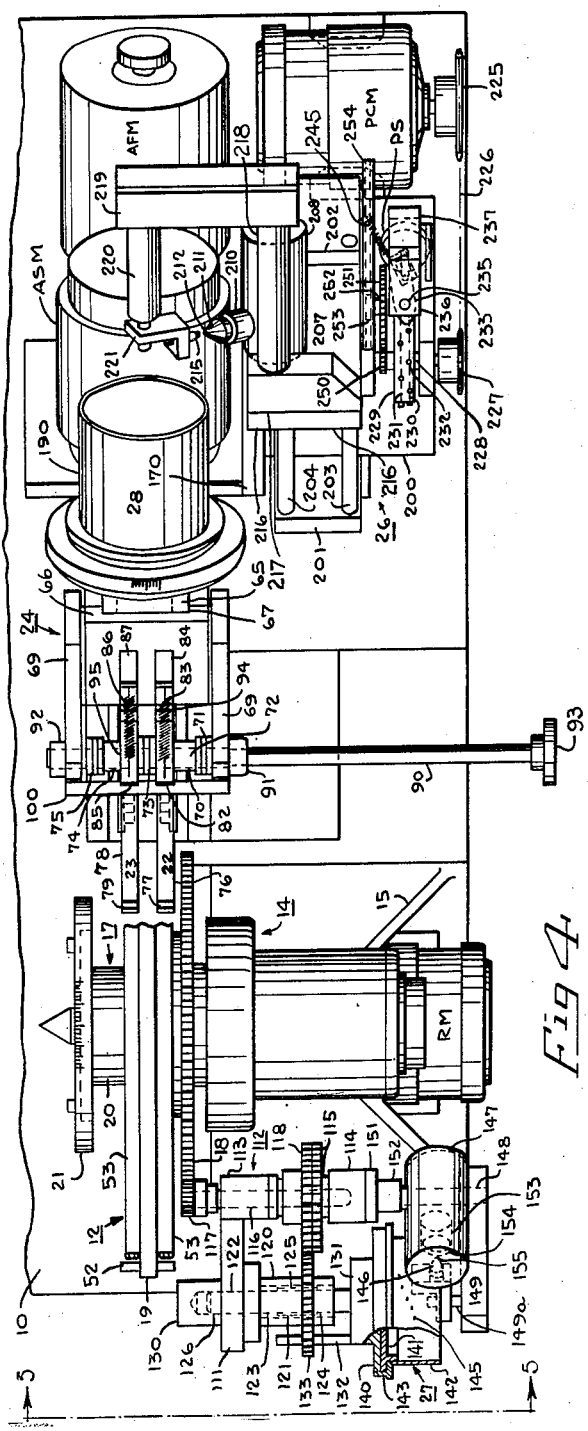
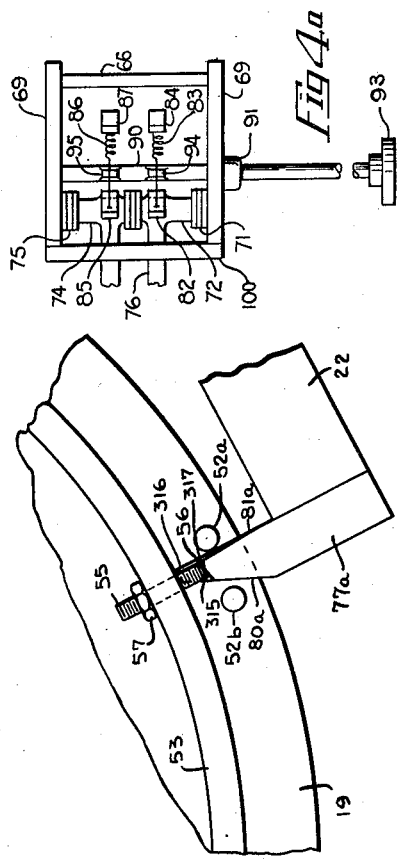
INVENTOR.
W.S. Tandler et al.
BY
Campbell, Brumbaugh
Free and Graves Sept. 24, 1957 W. S. TANDLER ET AL 2,807,175
ROTARY INDEXING MECHANISM
Filed Dec. 31, 1952 6 Sheets-Sheet 5
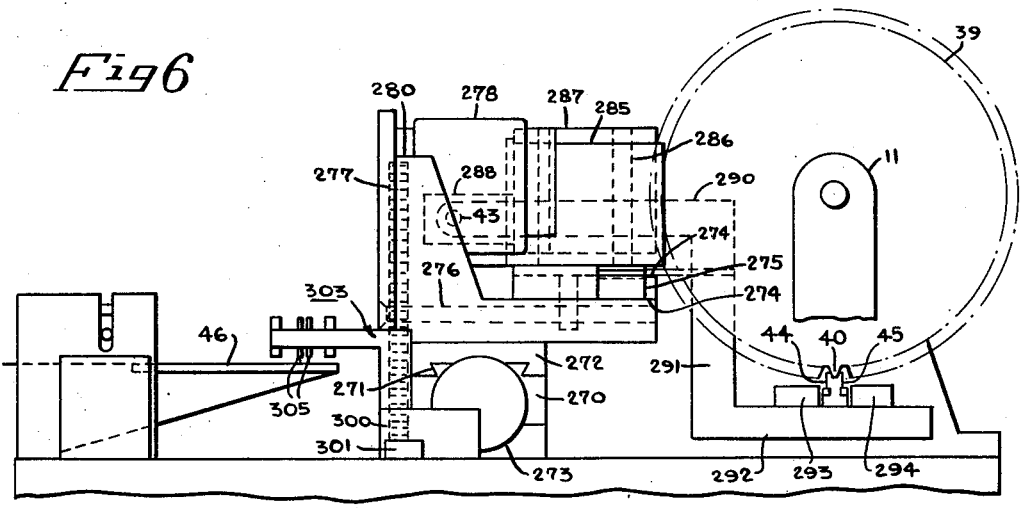
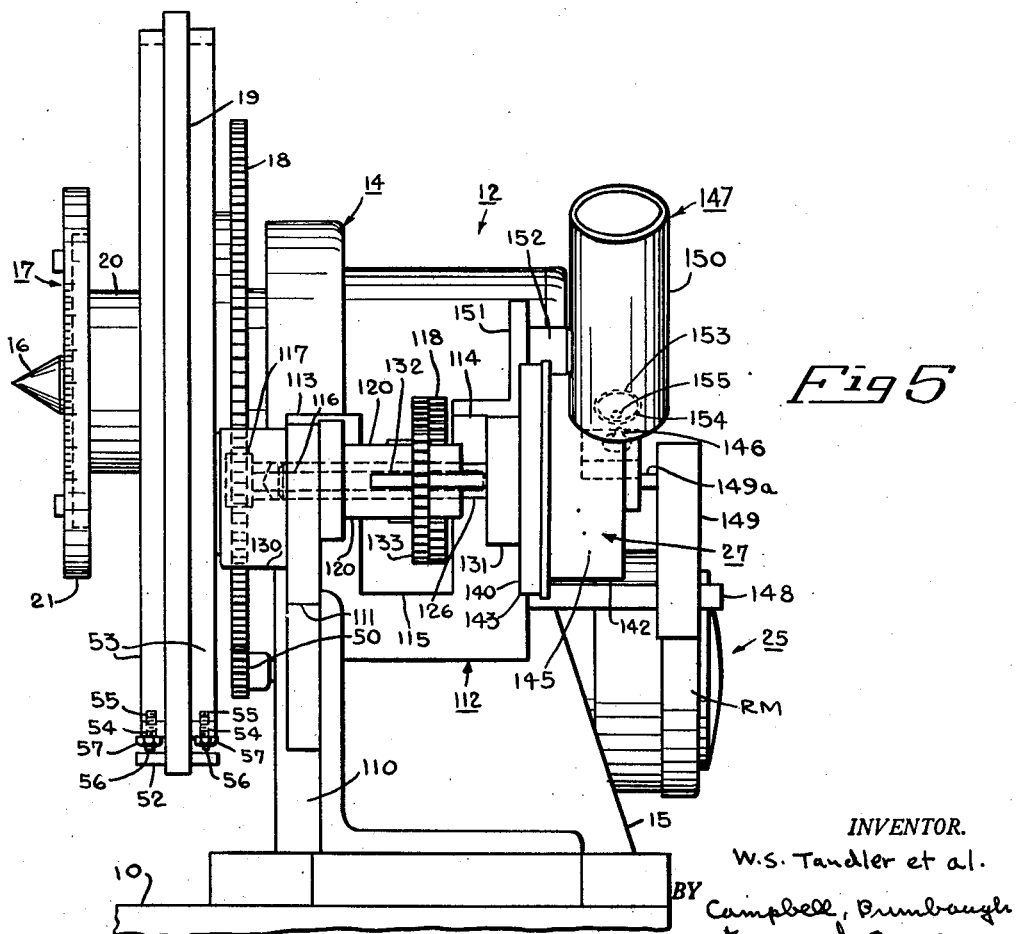
INVENTOR.
W. S. Tandler et al.
BY Campbell, Brumbaugh, Free and Graves Sept. 24, 1957  W. S. TANDLER ET AL  2,807,175
ROTARY INDEXING MECHANISM
Filed Dec. 31, 1952  6 Sheets-Sheet 6

INVENTOR.
W.S. Tandler et al.
BY
Campbell, Brumbaugh
Free and Graves

United States Patent Office 2,807,175
Patented Sept. 24, 1957

2,807,175

ROTARY INDEXING MECHANISM

William S. Tandler and Morris Grossman, New York, N. Y., assignors, by mesne assignments, to The Warner & Swasey Research Corporation, Cleveland, Ohio, a corporation of Ohio Application December 31, 1952, Serial No. 328,992

17 Claims. (Cl. 74—815)

This invention relates generally to rotary indexing mechanisms for angularly indexing an element with a high degree of precision to any one or more of a number of selected index positions. It also has to do with novel gauging apparatus utilizing indexing mechanism of this character for accurately positioning a work piece to be gauged.

Indexing mechanisms of the types available heretofore have not been entirely satisfactory. In one common form of mechanical apparatus, worm gearing is utilized for imparting desired angular displacements to an element. Such apparatus is not fully automatic in operation and it is subject to serious errors resulting from backlash, wear and the like, so that it is not suitable for high precision work. On the other hand, the optical types of indexing mechanisms sometimes employed where a high degree of precision is required, are rather delicate in construction and require relatively highly skilled personnel for their operation.

It is an object of the invention, accordingly, to provide new and improved rotary indexing mechanism which is free from the above-noted deficiencies of the prior art.

Another object of the invention is to provide new and improved rotary indexing mechanism of the above character which is capable of positioning an element with a high degree of precision to a number of angularly spaced apart principal stations.

A further object of the invention is to provide new and improved rotary indexing mechanism of the above character in which an inaccuracy due to play and backlash is eliminated.

A still further object of the invention is to provide new and improved rotary indexing mechanism of the above character which is capable of positioning an element with high precision to intermediate angularly spaced apart positions in a continuous range between the abovementioned principal stations.

A still further object of the invention is to provide new and improved rotary indexing mechanism of the above character in which for step-by-step operation an element is adjusted automatically in turn to each of a number of preselected index positions which may be at principal stations or which may be irregularly located with respect to the principal stations, as desired.

A still further object of the invention is to provide novel gauging apparatus embodying rotary indexing mechanism of the above character for gauging with high precision the angular position and profiles of elements such as gear teeth, for example.

According to the invention, a number of equally spaced principal angular stations for a rotary indexing head are determined by the interactions of two sets of physical elements with at least one locking pawl in a manner which permits location of these principal stations with great accuracy. One of the sets of elements comprises an outer circle of axially extending pins, circumferentially spaced around a carrier disc as evenly as the best machine practice will allow. The other set of elements comprises a smaller concentric circle of radially aligned pins adjustable in any manner in radial extension, each radial pin being mounted on the carrier disc intermediate the two adjacent pins. These radial pins may consist, for example, of screws threadedly mounted in radial holes in at least one flange axially projecting from the carrier disc. The locking pawl, disposed tangentially with respect to the carrier disc and constrained to pivot at one end, carries at its free end an inwardly extending tooth, having a flat vernier face tilted at a slight angle to the carrier disc radius. The pawl may be moved about its pivot to an outer limit where the tooth clears the pins and to an inner limit where the tooth enters between adjacent axial pins to bear against the outer tip of a radially aligned pin.

For indexing to a new position, the pawl is retracted to its outer limit and the carrier disc is rotated forwards slightly further than the desired position. At this point, the pawl is swung inwards causing its tooth to be inserted between two axial pins as far as the interjacent set screw will allow. The rotation and torque on the carrier disc is then reversed so that the back side of the forward axial pin abuts with moderate force against the vernier face of the tooth to position the carrier disc at a particular station.

It will be recognized that since the vernier face is at an angle to the carrier disc radius, by varying the inward travel of the tooth to change the wedging action of the vernier face, the position of the engaging axial pins can be slightly altered, and hence, the angular displacement of the locked carrier disc can be varied through a small range. It will also be recognized that the inner limit of travel of the tooth can be fixed at any desired value by adjusting the tip of the radially aligned pin which stops the tooth.

Hence, by an initial calibration procedure performed on the carrier disc, each radial pin may be set to a radial extension which, when the pawl engages both the radial pin and the corresponding axial pin, results in locating exactly for those pins a principal station for the carrier disc. Accordingly, the entire set of principal stations can be determined with great accuracy by adjustment of the individual radial pins in turn around the carrier disc. Further, since at the principal stations the carrier plate bears against the pawl with reverse torque, errors which might arise from play and backlash are eliminated.

In order to position the carrier disc and thus the indexing head to positions intermediate principal stations, the pivot pin for the locking pawl is mounted on a pawl carriage movable towards and away from the carrier disc substantially along a tangent to the same. With the pawl carriage in a retracted reference position, the indexing head is adjusted as described to the nearest principal station forward of the desired index position. The pawl carriage is then moved relatively to the indexing head to give the pawl a slight backwards displacement which will locate the head at the intermediate station. Since reverse torque is concurrently being applied, the indexing head will follow the pawl movement to cause the same axial pin to bear against the pawl tooth face as before, but at the intermediate position.

In order to provide for automatic positioning of the rotary indexing head in accordance with a preselected sequence of desired index positions, the preselected sequence is preliminarily recorded by a series of indicia pairs, one pair for each desired position. Each pair consists of one indicium formed on a coarse control member such as a drum, for example, and representing approximately the desired index position and another indicium formed on a fine control member such as a drum, for example, and representing the correction to be applied to the approximation supplied by the coarse drum to yield exactly the desired index position.

In automatic indexing operation, the rotary indexing head is moved from its latest assumed position in the preselected sequence towards the next position indicated, by suitable motive means actuated in response to switching means. The coarse drum rotates synchronously with the indexing head until a new coarse drum indicium is detected by a scanner. The head continues to move forward until it is positioned, as previously described, at the next principal station by a locking pawl. If the next position is at an intermediate station, the indexing head is then backed off from the principal station, which serves as a reference, by a tangential motion imparted to the locking pawl by a fast motor until the head is approximately indexed, as indicated by detection of the coarse drum indicium for the second time. Upon this second detection, the locking pawl tangential motion is continued by a slow motor until the new indicium on the fine drum is detected by another scanner. All motion of the indexing head then ceased, the head being indexed exactly to the desired position.

The invention also contemplates the provision of gauging apparatus embodying indexing mechanism of the character described above for effecting a gauging operation on a work piece.

For a better understanding of the invention, reference is made to the accompanying detailed description of a representative embodiment shown in the figures in the accompanying drawing in which:

Fig. 3 is a partial view in rear elevation of the indexing mechanism taken in the direction of the arrows 3—3 in Fig. 1 and showing in greater detail the features of the pawl carriage and fine indexing control mechanism;

Fig. 4 is a plan view of the indexing mechanism taken in the direction of the arrows 4—4 in Fig. 2 and showing in detail, features of the coarse indexing control mechanism;

Fig. 4a is a plan view showing in enlargement some of the details of interest in Fig. 4.

Fig. 5 is a view in side elevation of the indexing assembly taken in the direction of the arrows 5—5 in Fig. 4 and showing in detail certain features of the mechanism for obtaining coarse indexing control;

Fig. 6 is a view in side elevation of the gauging assembly taken in the direction of the arrows 6—6 in Fig. 1;

Fig. 10 is a showing of a modified tooth structure for the pawl.

While the indexing mechanism of the present invention is susceptible of general utility in a wide variety of different applications, it will be described herein for purposes of illustration as embodied in gauging apparatus for gauging gear teeth or the like.

*General description*

Figure 1:
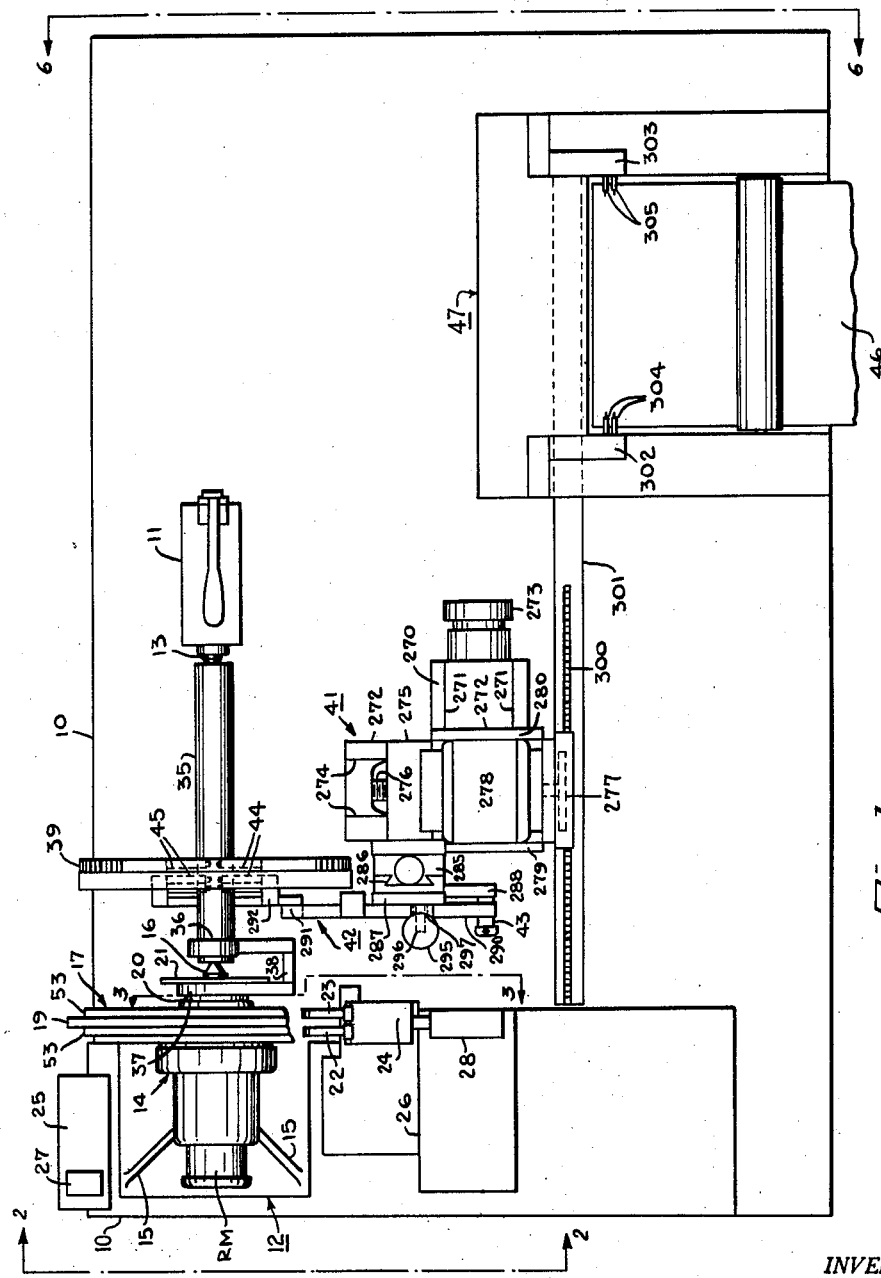
Fig. 1 is a plan view of gauging apparatus embodying indexing mechanism constructed according to the invention.

Referring now to Fig. 1, a bedplate 10 (upper left of Fig. 1) supports a spaced apart, linearly aligned tailstock 11 and index assembly 12. The tailstock 11 (upper middle of Fig. 1) carries a hardened conical center 13 which, in a conventional manner, is axially adjustable towards or away from the index assembly.

The index assembly 12 itself includes a conventional tapered bearing assembly 14 raised above the bedplate 10 by a conventional support 15, the bearing assembly 14 in turn containing internally and supporting at one end a stationary shaft (not shown) which carries at its other end another stationary hardened conical center 16. The stationary shaft is enveloped by a concentric fixed bushing (not shown) the outer surface of which acts as a bearing surface. Mounted for free rotation upon this bearing surface and centered thereby, is a rotary indexing head 17 including as integrally joined elements a spur gear 18 (Fig. 5), a circular carrier disc 19, a sleeve 20 and a flange 21.

The rotary head 17 is adapted to be locked in indexed position at either standard positions at principal stations or intermediate positions by the locking pawls 22 and 23 carried by a pawl carriage 24 (middle left of Fig. 1). Semi-automatic indexing of the rotary head 17 to desired index positions in accordance with a preselected pattern of the same can be accomplished by a coarse control assembly 25 (upper left, Fig. 1) and a fine control assembly 26 (middle left, Fig. 1) which drive the rotary head 17 under guidance of indicia (not shown in Fig. 1) borne by associated coarse and fine control drums 27 and 28.

Between the hardened centers 13 and 16 is supported an arbor 35 (upper middle and slightly left in Fig. 1) having at its ends conical sockets (not shown) into which the hardened centers project. At the end of the arbor 35 proximate the indexing head 17, a dog 36 is tightly clamped over the arbor while a similar dog 37 is clamped over the sleeve 21 of the rotary index head. The dogs 36 and 37 are connected by a coupling bar 38 with the result that rotation of the index head 17 causes simultaneous angular movement of the arbor 35 about the hardened centers 13 and 16 which support it. The arbor 35 carries in rigidly fixed relation a work piece 39 to be gauged, the work piece in the present instance taking the form of a spur gear having the usual gear teeth 40 (Fig. 6) around its periphery. Proximate to the work piece 39 a gauging mechanism 41 (lower middle and slightly left) is shown in Fig. 1 which is adapted to gauge successively each of the teeth 40 of the spur gear 39.

By the use of the tapered bearing assembly 14 as one of the mountings for the spur gear 39, the spur gear 39 can be aligned in a well known manner for exact concentricity with a predetermined axis selected for gauging.

Considering now the gauging assembly 41, it comprises a probe bar 42 extending tangentially to the spur gear 39 to be gauged, the probe bar 42 being pivoted at its outer end by a pivot pin 43 and carrying at its inner end, face to face, two sets of probes 44 and 45 adapted to gauge opposite sides of the teeth 40 formed in the spur gear 39. Normally the probe bar 42 is swung about its pivot pin 43 away from the spur gear 39 so that the probes 44 and 45 clear the teeth thereof. For indexing, however, when a tooth 40 to be gauged is brought into index position by the rotary index head 17, the probe bar 42 is swung inwardly so that the two oppositely facing probe sets 44 and 45 bracket the tooth to be gauged. Subsequently, the probe bar 42 is given a reciprocating motion to-and-fro along a tangent to the spur gear 39 so that first one set and then the other set of probes contact the opposite sides of the gear tooth 40.

The locations with respect to a reference datum at which the probes contact the gear tooth faces are indicated by marks on a record strip 46 incorporated in a recording unit 47 (lower right of Fig. 1). From the marks on the record strip, deviations with respect to desired predetermined tolerances can be determined for each tooth 40 of the spur gear 39 gauged. Thus it can be determined whether the spur gear, as a whole, is or is not acceptable as an article of manufacture.

The indexing assembly

Figure 2:
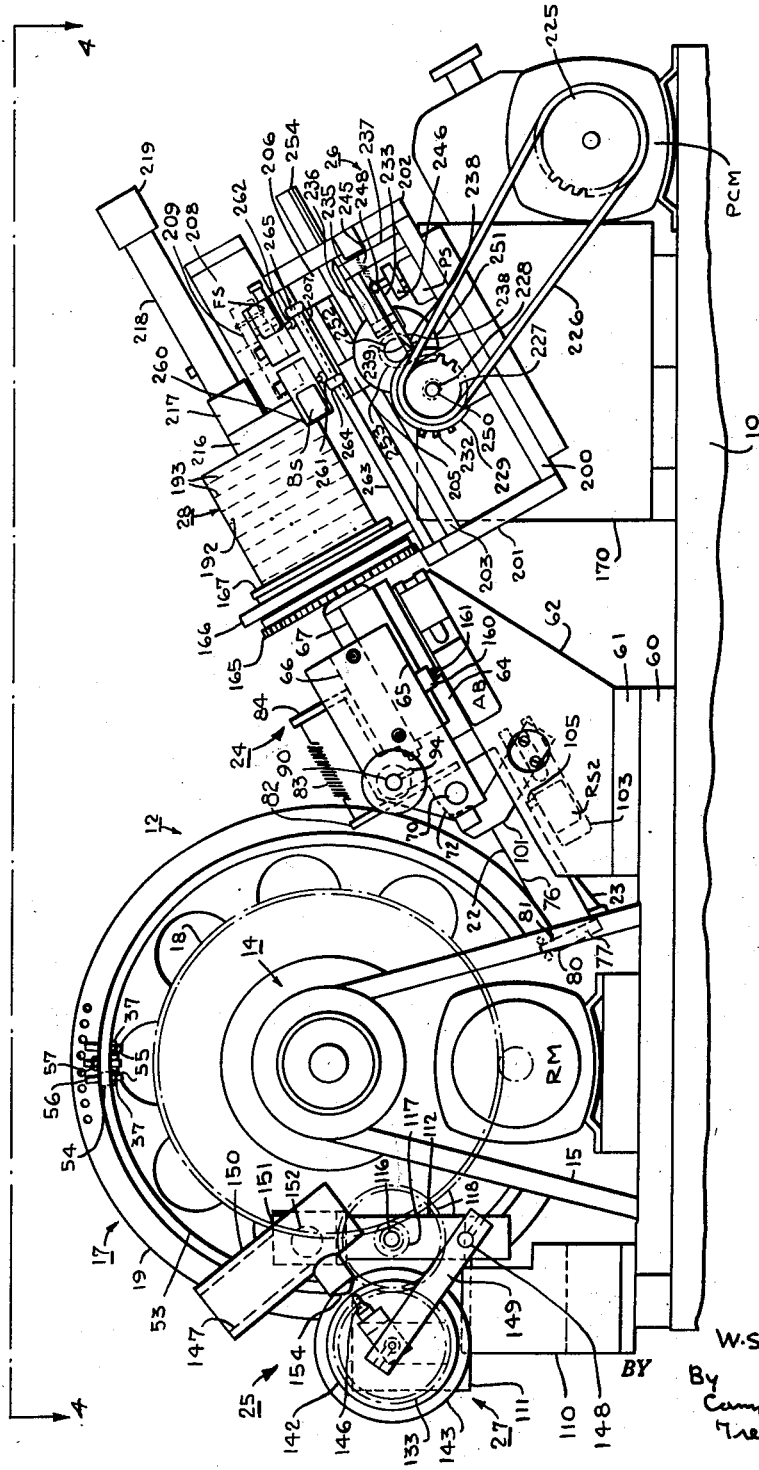
Fig. 2 is a view in front elevation of the indexing mechanism taken in the direction of the arrows 2—2 in Fig. 1.

The details of the indexing assembly may best be seen in Figs. 2, 3 and 4. As stated, the rotary index head 17 (Fig. 5) includes a spur gear 18, a carrier disc 19, a sleeve 20 and a flange 21 integrally joined together for free rotation about an axis. The index head 17 may be rotated in either a forward or a reverse direction (corresponding to clockwise and counterclockwise movement of the carrier disc as viewed in Fig. 3) by a three wire, slow, reversible capacitor motor RM (Fig. 2) which is capable of being continuously stalled. The motor RM drives through conventional coupling means (not shown) a pinion 50 (lower left of Fig. 5) which engages with the spur gear 18 to turn the same.

The rotatable carrier disc 19 which acts as the positioning member for the index head has around its periphery a set of 90 holes axially bored through the carrier disc and spaced from each other around a circle as evenly as the best machine practice will allow. Tightly fitted in each of the holes is an axially extending stop pin 52 (lower left of Fig. 5), part of which projects away from one face of the carrier disc and part of which projects away from the opposite face of the same. For clarity in the drawing, only a few of the holes 51 and pins 52 are shown. The stop pins 52 so carried by the carrier disc 19 form one set of elements for determining the principal stations for the index head, the angular distance between adjacent stop pins being, say, 4 degrees.

The carrier disc 19 has formed on each of its sides (Fig. 5) an axially projecting annular flange 53, both flanges 53 being of the same diameter. Each flange 53 is pierced by 90 radially extending threaded holes 54 which are staggered with respect to the stop pins 52 so that a radial hole is disposed intermediate each two adjacent pins. Each of the radial holes 54 in these flanges 53 contains a screw 55 which by rotation, is axially movable so that the radial extension of its outer end or tip 56 from the center of the carrier disc may be lengthened or shortened. When adjusted to a desired extension, each screw 55 may be locked in place by suitable means such as a locking nut 57. The 90 screws 55 form a second group of elements which, with the 90 stop pins 52 determine the location of principal stations for the rotary index head.

The carrier disc 19 and thus the index head 17 and work piece 39 moved thereby are positioned by the arrangement now to be described. Secured to the bedplate 10 is a base 60 (lower right, Fig. 3) upon which in turn is mounted a sub-base 61 which in turn carries a pair of vertical support plates 62 spaced apart but parallel to each other so that one plate lies hidden behind the other in Fig. 3. Both support plates 62 have similarly slanting top edges 63 which together define a plane which, in extension, passes close to the periphery of the carrier disc 19 and which is parallel to and closely spaced from a tangent to the carrier disc.

The upper portions of the support plate top edges 63 are joined by a spacer plate 64 (Fig. 3) upon which in turn is mounted a hollow block 65 which acts as the fixed member of a slide. A second hollow block 66 representing the corresponding movable member of the slide is dovetailed in a conventional manner into guideways 67 in the block 65 so that the block 66 is constrained to move towards or away from the carrier disc 19. Attached to the sides of the block 66 as by a set of bolts 68, for example, are a pair of side pieces 69 which, together with the block 66, form the pawl carriage 24. The side pieces 69 support by the ends thereof, a transversely extending pivot pin 70 located at the forward end of the pawl carriage 24.

The pivot pin 70 (middle of Fig. 4) passes through, in the order named, a set of washer-type spacers 71, a sleeve 72, another set of washer-type spacers 73, another sleeve 74, and a third set of spacers 75. The sleeve 72 is an integral part of the locking pawl 22, the other parts of which are (lower right of Fig. 3) an arm 76 extending from the sleeve to a point proximate the periphery of the carrier disc 19 and a tooth 77 projecting from the free end of the arm 76 inward toward the center of the carrier plate. Similarly, the sleeve 74 forms an integral part of the locking pawl 23 having a similarly shaped and disposed arm 78 and tooth 79. The pawls 22 and 23 are spaced with respect to the carrier disc 19 so that when swung inwardly, the respective pawls will engage portions of the stop pins 52 and the tips 56 of set screws 55 on opposite sides of the carrier disc.

For each locking pawl, the inwardly projecting pawl tooth has a beveled portion 80 on its leading side which, with rotation of the carrier disc 19 in the clockwise direction as seen in Fig. 3, enables various stop pins 52 encountered by the tooth to cam the locking pawl outwardly. Each pawl tooth, furthermore, has on its trailing side proximate the arm, a flat face 81 which makes an angle of slightly less than 90 degrees with the arm on which it is mounted. Accordingly, the flat face of each pawl tooth lies at a slight angle with respect to a radius from the center of the carrier plate. Finally, the arm of pawl 22 is slightly shorter than the arm of pawl 23 so that the flat faces 81 of the pawls are angularly displaced by two degrees, or exactly half of the angular distance between adjacent stop pins 52.

This two degree interval between the flat faces 81 of the pawls 22 and 23 for reasons soon understood corresponds to the angular spacing between adjacent principal stations for the rotary head 17. Consequently, it is seen that the presently disclosed indexing assembly furnishes, in all, 180 principal stations for the head around the circumference of a circle.

While only two pawls 22 and 23 are shown in the presently disclosed embodiment, it will be recognized that a greater number of pawls, as for example, four pawls, may be used, the pawls being mutually displaced so that their flat faces 81 subdivide the spacing between stop pins 52 into equal intervals in which case the number of principal stations to which the index head can be moved is equal to the product of the number of stop pins and the number of pawls.

Securely fastened to the sleeve 72 (Fig. 4a) is a rod 82 (Fig. 2) projecting at right angles to the arm 76. The rod 82 and the arm 76 together form a bell crank lever. The upper end of the rod 82 is joined by the tension spring 83 to an upright rod 84 which is secured to the top of the block 66. Similarly, a rod 85 (Fig. 3) fixed to the sleeve 74 (Fig. 4) is joined by the tension spring 86 (Fig. 3) to an upright 87 secured to the top of the block 66. Because of the bell crank lever action, the springs 83 and 86 urge their respective pawls to pivot inwardly about the pin 70 to assume positions in which their teeth enter between adjacent stop pins 52 on the carrier disc.

To the rear of the rods 82 and 85 is a freely rotatable horizontal shaft 90 (Fig. 4) supported in a conventional manner by journals 91 and 92 in the side pieces 69. The shaft 90 has a portion which projects outwardly from one of the side pieces 69 and has a hand knob 93 fixedly attached at the end thereof. The portion of the shaft 90 between the side pieces 69 carries a pair of lugs 94 (Fig. 2) and 95 (Fig. 3) disposed opposite the rods 82 and 85 and extending towards the same. Normally, the shaft 90 is maintained in a position so that the lugs do not engage their corresponding rods. By left-hand rotation of the hand knob 93, however, the lugs are turned to press the rods forwardly to cause both of the locking pawls 22 and 23 to clear completely the stop pins 52 of the carrier disc 19. As a consequence, in a manner later described, the carrier disc 19 may be freely rotated as far as is desired in the clockwise direction as seen in Fig. 3. Right-hand rotation of the hand knob 93 to its initial position disengages the lugs 94 and 95 from the rods to permit the locking pawls 22 and 23 to resume their normal positions with respect to the carrier disc.

The pair of side pieces 69 are joined at their forward ends by a cross piece 100. Securely fastened to the cross piece 100 are a pair of brackets 101 and 102 (Figs. 2 and 3) which extend downwardly below the pawls 22 and 23, respectively, and into the space between the support plates 69. The brackets 101 and 102 have fastened to their inner sides by bolts a pair of mounts 103 and 104, respectively, for the separate switches RS2 and RS1 which may, for example, be microswitches. The pair of microswitches RS2 and RS1 have contact buttons 105 and 106, respectively, biased by conventional spring means (not shown) normally to project outwardly from the microswitch and towards the carrier disc 19. The microswitch RS2 is aligned so that its contact button 105 is adapted to be depressed by the pawl 22 upon a movement of the latter about its pivot to an outer limit of travel. The microswitch RS1 is aligned to have its contact button 106 similarly depressed by a similar movement of the pawl 23.

The relationship between the carrier disc 19 and the pawl carriage 24 with its accompanying locking pawls can best be understood by a consideration of the operations which occur during the indexing of the index head from one principal station to another. In the indexing assembly disclosed, for any index position either the pawl 22 will be urged inwardly to contact both a stop pin 52 and the tip 56 of a screw 55 while the pawl 23 is cammed outwardly by a stop pin 52, or conversely, the pawl 23 will be urged inwardly to contact both a stop pin 52 and a screw 55 while pawl 22 is cammed outwardly by a stop pin 52.

Fig. 3 shows the carrier disc 19 locked in an indexed position, as described, in which the pawl 23 is urged inwardly so that the crown of its tooth 79 engages the tip of a screw 55 and the flat face 81 of its tooth 79 engages a pin 52a, while the pawl 22 is cammed outwardly with the crown of its tooth 77 resting against the outer surface of the pin 52a. With the pawls in these positions, the carrier disc 19 is latched at a particular principal station. Assume now that it is desired to index the carrier disc 19 forwardly to the next adjacent principal station, and assume further that the pawl carriage 24 during the indexing action remains in its retracted position all the way to the left as shown in Fig. 3. Indexing is initiated by closing a switch in a relay system to be later described, causing the motor RM to be energized to drive the carrier disc 19, in a clockwise direction as taken in Fig. 3, by motion transmission through the pinion 50 (left of the middle in Fig. 5) and the spur gear 18.

As a result, first, the pawl 23 (Fig. 3) will be cammed outwardly by the action of the stop pin 52b on its beveled surface 89 until the crown of the tooth 79 rests on the outer surface of the stop pin 52b. In moving to this position, the pawl 23 depresses the contact button 106 on the microswitch RS1.

As clockwise rotation continues, the pawl 22 falls off the stop pin 52a and consequently swings inwardly under the urging of the spring 83 (middle of Fig. 2) until the crown of the tooth 77 strikes the outer end of a screw 55 (Fig. 3). At this limit of inward travel, the pawl 22 is raised off the contact button 105 of microswitch RS2 (Fig. 2) permitting the same to spring outwardly. The changed conditions of the microswitches RS2 and RS1, as later described, cause the direction of rotation of the motor RM to be now automatically reversed so that the carrier disc 19 moves in the counterclockwise direction, as taken in Fig. 3, until the stop pin 52a bears against the flat face 81 of tooth 77. At this point, the motion of the carrier disc 19 ceases and the motor RM is stalled with the pin 52a under continuing reversed torque of the motor RM. The position of rest is determined by the position where the inward travel of the pawl tooth 77 is halted by the screw 55.

In a similar manner, the rotary head 17 is indexed to the next standard position, by again energizing the motor RM to drive the carrier disc in the forward direction (clockwise as taken in Fig. 3) until, in the sequence named, the pawl 22 is cammed outwardly by the pin 52b and the pawl 23 is freed so that it swings inwardly to project its tooth 79 into the space behind stop pin 52b. The direction of rotation of RM is then reversed so that the stop pin 52b is moved to bear against the flat face of the tooth 79. The carrier disc 19 and rotary index head 17 have now been advanced another two degrees.

It will thus be seen that in moving from any one index position to the next the condition of each of the two pawls 22 and 23 is reversed in a "walking" action with the pawl previously cammed outwardly swinging inwardly to lock the carrier disc 19 in position as the other pawl is cammed outwardly. Hence, first one and then the other of the pawls in alternate succession performs the locking function for the carrier disc 19 with the result that the latter is advanced one step at a time an angular distance equal to the spacing (in terms of degrees of arc for the carrier disc) between the flat faces of the locking pawls.

Hence, the rotary index head in the presently disclosed embodiment may be indexed, one by one, to 180 standard positions, 2 degrees apart, each standard position corresponding with a principal station which is located with great exactness. Alternatively, by modifying slightly the indexing cycle just described so that the motor RM continues to drive the carrier disc forwardly through a number of pawl reversals, it will be seen that the rotary head may be indexed from one standard position to any other desired standard position.

It will be seen that, by driving the index head slightly beyond the desired standard position and then reversing the motor RM to complete the indexing, the motor RM will be stalled but will continue to exert a reverse torque which forces the particular stop pin engaged against the flat face of the locking pawl engaged. In this manner, any error which may arise from play or backlash between the carrier disc and the locking pawls positioning is eliminated.

The coarse control mechanism

Automatic indexing of the character described above is accomplished through two separate sub-assemblies which are referred to, respectively, as the coarse control mechanism and the fine control mechanism. Each of these mechanisms will be considered in turn, the coarse control mechanism being described first.

Referring now to Figs. 2, 4 and 5, a vertical support plate 110 (Fig. 2) aligned parallel to the plane of the carrier disc 19 has secured to its upper portion a sleeve mounting plate 111. The plate 111, in turn has fastened to its right vertical edge a bracket 112 (Fig. 2) disposed parallel to the axis of the indexing head and consisting (Fig. 4) of two upstanding legs 113 and 114 (Fig. 5) of generally square cross section joined at the bottom by a horizontal member 115 (Fig. 5) of similar cross section. Journalled in the legs 113 and 114, respectively, is a horizontal shaft 116, one end of which carries a pinion 117 engaging the ring gear 18 on the indexing head 17. Additionally, the horizontal shaft 116 carries in the space between the legs 113 and 114 a spur gear 118 which is fixed to rotate with the shaft.

The sleeve mounting plate 111 has mounted on its side away from the carrier disc 19 a sleeve 120 (left side of Fig. 4) having a central horizontal bore 121 registering with a hole 122 of like diameter in the sleeve mounting plate. The bore 121, which parallels the indexing head axis, has two spaced apart sections 123 and 124 which are internally threaded while the section 125 in between is free of threads. This central bore of the sleeve further contains a threaded lead screw 126 which projects outwardly therefrom in one direction, passing through the hole 122 in the vertical support plate 111, and which in the other direction freely overhangs the base 60. The lead screw 126 is given the usual two-part support necessary to mount a shaft properly by the engagement of two threaded portions of the lead screw with the threaded sections 123 and 124 of the bore 121. As a result, any rotary motion imparted to the lead screw 126 will be concurrently accompanied by an axial movement of the lead screw in the bore.

At one projecting end, the lead screw is protected by a cover 130 mounted on the side of the sleeve mounting plate 111 opposite the sleeve 120. At the other projecting end the lead screw 126 carries a hub 131 of larger diameter than the sleeve, to an outer portion of which there is rigidly secured a coupling rod 132 disposed parallel to the axis of the lead screw.

The sleeve 120 which supports the lead screw 126 also supports on its outer cylindrical surface a spur gear 133 which, in a conventional manner, is restrained from axial movement while being maintained free for rotary motion about the sleeve. The spur gear 133 has formed therein an axially aligned hole which is adapted to contain in freely sliding relation the coupling rod 132 joined to the lead screw hub. The spur gear 133 is also positioned to engage the spur gear 118. As a consequence, when the ring gear 18 of the index head 17 is rotated, the motion thereof is transmitted by the pinion 117, the shaft 116, the spur gear 118, the spur gear 133 and the coupling rod 132 to the lead screw 126 so that the lead screw will rotate while at the same time moving in an axial direction with respect to the sleeve 120.

The hub 131 carried by the lead screw 126 is flared out at its end remote from the sleeve to form a mounting flange 140. Flush with the flat surface of this mounting flange 140 is disposed the back plate 141 of the coarse control drum 27, the other component of the coarse control drum being a thin walled, open ended hollow cylinder 142, one end of which is rigidly secured by a press-fit, or the like, to the back plate 141. The coarse control drum 27 is secured to the mounting flange 140 by an internally threaded annular locking ring 143, the threads of which engage threads on the peripheral surfaces of the mounting flange 140 and the back plate 141 of the drum. It will be seen that by unscrewing and then retightening the locking ring, a particular coarse control drum may be shifted in angular relation to the mounting flange or may be detached therefrom and a new coarse control drum substituted therefor.

Formed in a helical path on the control drum 27, not at, but near locations thereon corresponding to desired indexing positions, are a plurality of control indicia. In the present instance the indicia may take the form of very small apertures 145 (Fig. 5) formed in the cylinder 142. The presence of these apertures 145 may be detected by any suitable scanner means such as an electric lamp 146 and a photocell 147. The lamp 146 which is supported from the leg 114 of the bracket 112 by an arrangement consisting of the rods 148, 149 and 149a (Fig. 5), is disposed at a fixed point in space inside the cylinder 142 of the coarse control drum 27 to register with the mentioned helical path thereof.

The detecting photocell 147 is disposed in a cylindrical housing 150 which is spaced away from the bracket 112 by the right angle bracket 151 secured to the top of the leg 114 and by the rod 152. Protruding away from the cylindrical photocell housing 150 along the perpendicular from the lamp to the housing, there is a smaller cylindrical viewing chamber 153 (left side, Fig. 2) which is capped by a conical cover 154 having at its tip a viewing aperture 155 for the photocell 147. The lamp viewing apertures 155 and the light sensitive section of the photocell lie along a common optical path so that when one of the apertures 145 in the cylinder 142 of the coarse control drum permits passage of light from the inside to the outside of the cylinder 142 along this path, the photoelectric cell 147 will, in a conventional manner, convert the light received into an electrical signal.

*The fine control mechanism*

Referring to Figs. 2, 3 and 4, which best show the features of the fine control mechanism, the pawl carriage upper block 66 (Fig. 3) carries a downwardly extending nut 156 threaded on a precision lead screw 158 which is supported at two places, by journals (not shown) in the end sections of the lower block 65 in such a manner that the lead screw 158 is freely rotatable but axially immovable with respect to the lower block.

It will be apparent that appropriate rotation of the lead screw 158 will cause relative movement between the upper block 66 and the lower fixed slide block 65 to advance the carriage 24 towards the carrier disc 19. Conversely, opposite rotation of the lead screw 158 retracts the pawl carriage 24 from the carrier disc 19.

The pawl carriage 24 carries outside of and at the bottom of one side piece 69 (center of Fig. 2) a block 160. The block 160, upon retraction of the pawl carriage to a certain selected position, depresses the contact button 161 of a suitable switch AB as, for example, a microswitch, which button in turn opens the switch contacts for the microswitch. This certain position of the pawl carriage for which the contact button of the microswitch is depressed is the reset position at which the pawl carriage 24 is maintained when the carrier disc 19 is to be adjusted to a standard position at a principal station in the manner previously described. The opening of the contacts of the microswitch AB by the pawl carriage 24 at its reset position is utilized in a relay system in a manner later described.

The carrier disc 19 may be indexed to any desired position intermediate principal stations by first positioning the pawl carriage 24 by appropriate rotation of the precision lead screw 158 (Fig. 3) to the reset position. The motor RM is then energized to drive the carrier disc 19 in a forward direction (clockwise as seen in Fig. 3) until the principal station nearest exceeding in value the desired position is slightly overreached. At this time, the motor RM is reversed, and, as previously described, the carrier disc 19 is locked with reverse torque at the mentioned principal station by the abutment of a stop pin 52 against a locking pawl.

To reach the desired intermediate position, the precision lead screw 158, by means later described, is now rotated to move the pawl carriage 24 towards the carrier disc 19. The flat face 81 of the locking pawl presently locking the carriage disc undergoes the same displacement as the pawl carriage 24. Since the carrier disc 19 is currently experiencing a torque, counterclockwise in direction as seen in Fig. 3, the stop pin 52 abutting against the engaged locking pawl will follow the movement of the same to cause the carrier disc 19 to move through a small arc. When the desired intermediate position for the carrier disc is reached, the rotation of the lead screw 158 is halted, leaving the carrier disc 19 and rotary head 17 still under reverse torque but indexed at the desired position.

From an intermediate position assumed for indexing of the rotary head, the pawl carriage 24 can always be returned to its reset position by rotation of the lead screw 158 in the appropriate direction.

The helical pitch for the threading of the lead screw 158 preferably may be so chosen, for example, that for each complete rotation of the lead screw 158, the locking pawls 22 and 23 will move a distance which permits the carrier disc 19 to turn through 30° of arc.

The precision lead screw 158 has (Fig. 3) an unthreaded continuation which projects outwardly from the block 66 in a direction away from the carrier disc 19 and carries, in the order named, a lead screw drive gear 165, a calibration ring 166, a locking ring 167 and the fine control drum 28. The functions of each of these elements named and the components associated therewith will now be taken up in turn.

The lead screw drive gear 165 is adapted to be rotated to drive the lead screw by the arrangement now to be described. Secured to the bedplate 10 there is a vertically rising main support plate 170 (left of center and low in Fig. 3) to which, in turn, there is attached the housing of a fast align motor AFM (far left and low in Fig. 3), the housing of a higher located, slow align motor ASM and, to the right of both motors an auxiliary support plate 171 for maintaining in proper alignment the gearing associated with the mentioned motors. Both the fast align motor AFM and the slow align motor ASM are disposed with their shafts parallel to the axis of the precision lead screw 158 while the axiliary support plate 171 is at right angles to the same. The fast align motor AFM may be of the three wire reversible capacitor type, for example, while the slow align motor ASM may be a unidirectional capacitor motor. The fast align motor AFM has associated therewith a conventional electromagnetic brake (not shown) so that when the fast align motor is deenergized the brake operates to immediately arrest the motion of the motor.

The fast align motor AFM drives through a shaft 172, a conventional coupling assembly 173, and another shaft 174, a pinion 175. Associated with the slow align motor ASM there is a normally uncoupled shaft 176 to which are rigidly fixed the pinions 177, 177a and 178. The pinion 175 and the pinion 177 are coupled by an idler gear 179 carried by a shaft 180 journalled in a suitable bearing assembly 181 mounted on the auxiliary support plate 171. As a result, the movement of the fast align motor AFM (when the same is energized) and the slow align motor ASM is deenergized is transmitted through gears 175, 179 and 177 to the shaft 176 and hence to pinion 178.

The pinion 178 is normally coupled to a gear 182 rigidly mounted on a shaft 183 which is journalled in a bearing assembly 184 mounted on the auxiliary support plate 171. The shaft 183 also carries for fixed rotation therewith a gear 185 which engages the leadscrew driving gear 165. As a consequence, when motors AFM and ASM are, respectively, energized and deenergized the gears 182 and 185 act as an idler assembly to transmit rotary motion from the pinion 178 to the leadscrew driving gear 165.

The motor ASM upon energization thereof is adapted, by the concurrent energization of a conventional electromagnetic clutch and gear shift (not shown), to be coupled with the shaft 176 to cause rotation thereof. Shaft 176 is simultaneously shifted by the gear shift to disengage pinions 177 and 178, respectively, from idler gears 179 and 182 and to engage pinion 177a with the gear 185. Upon deenergization of motor ASM and the gear shift, the shaft 176 is uncoupled from the motor and is restored to its original position. Thus motors AFM and ASM during the times they are energized act independently to drive the lead screw driving gear 165.

As is later described, the fast align motor drives the leadscrew 158 during various parts of an indexing cycle, whereas in another part of a cycle the slow align motor drives the lead screw.

The calibration ring 166 (center and high in Fig. 3) has formed around its periphery a set of equally spaced graduations (not shown). The calibration ring 166 merely serves the purpose of visually indicating the angular position of the fine control drum 28.

The fine control drum 28, which is similar in structure and mounting to the coarse control drum 27, is comprised of a thin walled open-ended cylinder 190 and a backing plate 191 by which, in conjunction with the locking ring 167, the fine control drum 28 can be clamped to a mounting flange 191a on the precision lead screw 158 to rotate therewith. As in the case of the coarse control drum 27, information indicia are established upon the fine control drum 28 in the form of small apertures 192 drilled through the wall of the cylinder 190 to indicate the location of positions to which the indexing head is to be moved. In the case of the fine control drum, however, the indicia, rather than being distributed along a single helical path, are rather distributed in a plurality of peripheral lines 193 disposed side by side in an axial direction along the drum, each line containing one, and only one aperture 192.

As is more fully described later, each peripheral line 193 is utilized in a separate indexing operation in the preselected sequence of desired index positions for the rotary head 17. Correspondingly, the single indicium 192 contained in each peripheral line 193 represents, by means of its angular displacement from an imaginary reference point 194 on the line, the exact position to which it is desired to bring the rotary indexing head to produce an indexed state for the same.

To effect step-by-step adjustment of the indexing head 17 to each of a plurality of desired index positions in turn, it is apparent that each of the plurality of peripheral lines 193 upon the cylindrical surface of the fine drum 28 must be scanned in turn in a corresponding step-by-step manner, the angular position of the indicium 192 belonging to each line 193 being determined in the course of the scanning of the line. The arrangement by which this step-by-step scanning of the peripheral lines takes place will now be more fully described in the following paragraphs.

Referring now to Figs. 2 and 4, the vertically rising main support plate 170 (right and low in Fig. 2) has securely fastened thereto, to project outwardly from and at right angles to one side thereof, a platform 200 which is tilted at an angle to the horizontal to parallel the axis of the precision lead screw 158. The platform has fastened to its extremities and, at right angles to the platform, a pair of end plates 201 and 202. The upper portions of the two end plates are joined by a pair of slider rods 203 and 204 (Fig. 4) of circular cross section, which slider rods are spaced the same distance from the platform 200 to run parallel with the same. Each of the slider rods 203 and 204 passes in freely slidable but close fitting relation through a hole (not shown) in a cross block 205 (Fig. 2) and a hole (not shown) in another cross block 206. Thus, the cross blocks 205 and 206 are supported by the slider rods 203 and 204 to move freely to-and-fro thereon.

The upper faces of the cross blocks 205 and 206 support a base 207 for a fine drum scanner unit. Securely fastened to the scanner base 207 is a cylindrical photocell housing 208 containing a photocell 209. Projecting outwardly at right angles to the surface of this photocell housing 208 and pointed towards the exterior cylindrical surface of the drum 28 there is a smaller cylindrical viewing chamber 210 (Fig. 4) capped by a conical cover 211 which contains at its apex an aperture 212 permitting the passage of a small ray of light from the exterior to the sensitive portion of the photocell 209.

The scanner base 207 also carries for movement therewith a lamp 215 (right-hand side and at a medium level in Fig. 4) which registers with the aperture 212 in the cover 211. The lamp 215 is spaced away from the scanning assembly base by a support arrangement comprising an upright 216 (Fig. 2) secured to the forward portion of the base 207, a block 217 secured to the upright, a support rod 218 extending from the block 217 away from the carrier disc 19, a cross piece 219 having one end secured to the rearmost end of the support rod 218 and extending from this junction in a horizontal direction towards the drum axis, another support rod 220 (Fig. 4) secured to the other end of the cross piece and extending towards the carrier disc for a distance along a parallel to the drum axis, and a right angle bracket 221 mounted upon the forward end of the support rod 220. The lamp 215 is mounted upon one leg of this bracket to face towards the interior cylindrical surface of the drum. This support arrangement described has the advantage that it permits scanning by the lamp 215 and photocell 209 over the entire axial extent of the drum, the support arrangement at all times clearing the open ended cylinder 190.

While in Figs. 2, 3 and 4, for clearer illustration, the scanner base 207 is shown sufficiently to the rear to bring the lamp 215 and the aperture 212 of the photocell 209 completely out of alignment with the cylindrical surface of the fine drum 28, in ordinary operation the scanner base is positioned so that the lamp and the viewing aperture of the photocell register with a portion of the surface of the drum 28. The locus of travel of the scanner base and the disposition of the photocell housing 208 upon the base are such that the aperture 212 is spaced in close proximity to the outer cylindrical surface of the drum 28.

Similarly, the lamp 215 is so mounted with respect to the scanner base 207 that during movement of the base, the lamp will track along the inner cylindrical surface of the fine drum 28 in close proximity thereto. As is apparent, because of the interposed opaque thickness of the cylinder of the fine drum, ordinarily, no light will pass from the lamp 215 to the sensitive portion of the photocell 209 to produce an electric signal. When, however, an aperture 192 in the cylinder 190 happens to register with the optical path from the lamp to the photocell, a beam of light will pass along the path to cause the photocell to create an electric signal in a well-known manner.

Considering now the arrangement by which the scanning assembly is positioned step by step to register in turn with each of the peripheral lines 193 distributed along the drum 28, a three wire reversible capacitor motor PCM (lower right of Fig. 2), capable of being continuously stalled, exerts a continuous torque upon a shaft 228 through a sprocket 225, a chain 226 and another sprocket 227. This torque upon the shaft 228 is normally exerted in the counterclockwise direction as seen in Fig. 2. Rigidly secured to the shaft 228 is an escapement drum 229 having projecting from its periphery (Fig. 4) a pair of separate peripheral rows 230 and 231 of escapement pins 232, the pins 232 in each row being equally spaced around the escapement drum, but the pins of one row being staggered with respect to the pins in the other row, so that each pin on one row is spaced equidistantly between two pins of the other. Ordinarily, the escapement drum 229 is restrained from rotation in response to the torque exerted upon it by an escapement lever 233 which engages a pin of one or the other of the peripheral rows 230 and 231 to lock the escapement drum 229 from movement.

The escapement lever 233 which is movable in a radial plane of the drum, has a median portion on its extension pivoted about a pivot pin 235 carried by a support 236 paralleling the platform 200, the support in turn being secured to a support 237 at right angles to and fastened to the platform. The pivot pin 235 for the escapement lever 233 is positioned equidistantly from each of the peripheral pin rows 230 and 231 of the escapement drum 229 with the result that the escapement lever 233 may be swung about the pivot pin 235 in one direction to contact one stop (not shown) which positions the lever to register with the pins of peripheral row 230 or similarly the escapement lever may be swung about the pivot pin 235 in another direction to bear against a second stop (not shown) which positions the lever to register with the pins in the other peripheral row 231. The escapement lever 233 has at its end proximate the escapement drum, a lower flat face 238 (right and at medium height in Fig. 2) and an upper beveled face 239 the purpose of which latter face will be later described.

The position of the escapement lever is determined by the opposing actions of a tension spring 245 and a conventional rotary solenoid PS which is coupled to the back end of the lever by a coupling consisting of the links 246 and 248. Initially the escapement lever 233 is maintained by the tension spring 245 in a position in which its lower flat face engages one of the pins of the peripheral row 230 (Fig. 4). In such condition all motion of the escapement drum 229 forward (counterclockwise as seen in Fig. 2) is obstructed and the motor PCM is consequently stalled, continuing, however, to exert torque which causes the engaged escapement pin 232 to be forced against the flat face 238 of the lever.

Upon energization of the rotary solenoid PS at the beginning of an indexing cycle, by means later described, the escapement lever 233 is moved to register with peripheral row 231 (Fig. 4). Because of the torque applied by the stalled motor PCM, the escapement drum 229 advances in the counterclockwise direction, as shown in Fig. 2, until it once again is locked by the engagement of the flat face 238 of the lever with an escapement pin 232 in the peripheral row 231. The pin 232 which thus engages with the lever is that pin in row 231 which follows next around the drum circumference the pin 232 in the row 230 initially engaged by the lever 233.

Upon deenergization of the solenoid PS during another part of the same indexing cycle, the escapement lever 233 under the influence of the tension spring 245 returns to its original position of registry with the peripheral row 230 (Fig. 4). Again, and in a simlar manner, the escapement drum 229 will advance forward until the flat face 238 of the lever engages the pin 232 in row 230 next to the pin 232 initially engaged by the lever 233. Hence, the total advance for the escapement drum 229 during energization and deenergization of the rotary solenoid PS is equal to the spacing between two escapement pins in the same peripheral row. This total advance for the escapement drum 229 is utilized in each indexing cycle to move the scanner base 207 by the means now to be described.

Rigidly secured to the shaft 228 (Fig. 2) there is a pinion 250 (Fig. 4) which drives a spur gear 251 rigidly affixed to a freely rotatable shaft 252 (Fig. 4) which is spaced away from the platform 200 by a conventional support (not shown). The shaft 252 carries in rigidly affixed relation another pinion 253 which engages with a rack 254 attached to the underside of the cross blocks 205 and 206. As a consequence, for each two movements of the escapement drum 229 corresponding to an energization and deenergization of the rotary solenoid PS the rack 254 will be driven forward one full registering motion, carrying with it the scanner base 207. Starting from an initial position, each time the scanner base 207 is so advanced the lamp 215 and photocell 209 register with a new peripheral line 193 for scanning thereof to determine the angular position, in terms of drum circumference, of an indicium 192 thereon.

While in theory at least a separate indicium 193 should be provided for each indexing position, in practice this is in many cases not necessary. For example, if it is desired to use indexing mechanism of the type described herein, in which there are intervals of two degrees between principal stations, to establish indexing intervals of, say, 3.6°, it happens that the sequence of corrections to be applied at each principal station is cyclic and repeats itself after each fifth index position. In such case, only five indicia 193 representing the five corrections that are repeated cyclically, are necessary if means is provided for restoring the scanning mechanism to its initial position after each fifth indexing operation.

The electromechanical arrangement which permits this recurrent employment of the indicia on the fine drum 28 will now be described. Referring to Fig. 2, the scanning assembly base 207 carries along a longitudinal edge a limit switch assembly 260 comprising the limit switches BS and FS. The limit switches BS and FS which are positioned at the near and far ends, respectively, of the mounting, as referred to the pawl carriage 24, have contact buttons 261 and 262, respectively, which project outwardly and downwardly from the scanning base assembly.

In alignment with these contact buttons is disposed a rod 263 carrying two actuator blocks 264 and 265 which are separately adjustable in position along the extension of the rod in a conventional manner, as for example, by separate screws (not shown). The actuator blocks 264 and 265 are adapted, upon appropriate positioning of the scanner base 207, to strike, respectively, the contact buttons 261 adn 262 of the limit switches BS and FS thereby opening the contacts of the former and closing the contacts of the latter.

In operation, the motor PCM, in the manner previously described, advances the scanning base 207 by a step by step motion in a direction away from the carrier disc 19 until the lamp 215 and the aperture 212 of the photocell 209 register with the last peripheral line 193 on the drum 28. With the next forward step the actuator block 265 strikes the contact button 262 of the switch FS, causing the rotational direction of the motor PCM, and hence of the escapement drum 229 to be reversed through a relay system later described.

When this event occurs, the pins 232 of the escapement drum 229 engage the upper face 239 rather than the lower face 238 of the escapement lever 233. As mentioned, however, this upper face 239 is beveled in such a form that the escapement pins 232 upon striking the upper face can move the escapement lever 233 aside and, can, therefore, pass the escapement lever without locking. Accordingly, the escapement drum 229 is driven in the reverse direction without restraint by the escapement lever with the further result that the scanner base 207 is driven by the motion transmitting mechanism previously described in a direction backwards towards the carrier disc 19.

This reverse movement of the scanner base 207 continues until the actuator block 264 strikes the contact button 261 of the limit switch BS. Upon this event, the rotational direction of the motor PCM is again reversed to its normal condition with the result that the escapement drum 229 will be locked in the normal fashion by the flat face 238 of escapement lever 233. When this locking takes place, the scanner base 207 will be so positioned that the aperture 212 in the scanning photocell 209 and the lamp 215 will be positioned to subsequently register with the first peripheral line 913 upon the fine drum 28.

*The gauging assembly*

A typical gauging assembly 41 which may conveniently embody the rotary indexing mechanism of the invention is represented in Figs. 1 and 6. Referring to these figures, secured to the bed plate 10 to the side of the arbor 35 is, as one member of a longitudinal horizontal slide, a block 270 (center of Fig. 1) having formed therein dovetail guideways 271 aligned parallel to the arbor. Riding in the guideways 271, as the other member of the slide, is another block 272 which may be termed the offset base. The longitudinal position of the offset base 272 may be adjusted by a knob 273 and a lead screw (not shown) which cooperate with the two members of the horizontal longitudinal slide in a conventional and well known manner.

The offset base 272, in turn, acts as one of the members of a second slide disposed for travel in a direction perpendicular to the face. The offset base has formed therein a set of conventional dovetail guideways 274 in which rides an offset carriage 275. The offset carriage 275, in the same manner as previously described for the pawl carriage 24, may be given a to-and-fro motion with respect to the offset base 272 by means of a precision lead screw 276. This precision lead screw 276 may be rotated in either direction through a suitable gear train (represented symbolically by the dotted outline 277) which is driven by an offset motor 278 supported above the offset base by a pair of side pieces 279 and 280. The offset motor 278 may be of the conventional three wire reversable capacitor type.

Secured to the edge of the offset carriage is, as a part of a vertical dovetail slide, an inner block 285 (Fig. 1) having ways 286 formed therein in which rides an outer block 287. The vertical position of the outer block 287 with respect to the inner block 285 may be adjusted as desired in a conventional manner, as, for example, by a set screw (not shown). The block 287 carries a backwardly extending horizontal bracket 288 from the rear end of which projects outwardly and at right angles the pivot pin 43 which supports the probe bar 42.

The probe bar 42 which is freely rotatable about the pivot pin 43, comprises, starting at the pin, a horizontal section 290 (Fig. 6), a vertical section 291 and another horizontal section 292, the sections being so disposed that the probe bar 42 extends from the pivot pin 43 forwardly to pass underneath the workpiece 39 to be gauged and to a point beyond. The horizontal section 292 carries on its upper side two probe holders 293 and 294 (Fig. 6) with confronting faces, from which faces pairs of twin probe members 44 and 45, respectively, first extend vertically and are then bent at right angles to extend horizontally towards one another.

Normally, the offset carriage 275 is maintained on its ways 274 in a central reference position while concurrently the probe bar 43 is swung downwardly to a position where it is arrested by a stop (not shown). In this downward position, the probes 44 and 45 carried by the probe bar 42 completely clear the teeth 40 of the gear 39 to be gauged. However, each time a new gear tooth 40 is brought into gauging position by appropriate movement of the indexing assembly, the probe bar 43 is swung upwardly about its pivot pin 43. This upward movement is accomplished through the agency of a solenoid 295 (Fig. 1) secured to the vertical outer block 287 and having its armature coupled to the horizontal section 290 of the probe bar by a rod 296 extending downwardly from the solenoid and then inwardly to rest in a hole 297 in the probe bar.

Upon energization of the solenoid 295, the probe bar 43 is lifted by the same until it bears against a stop (not shown). In this upward position (Fig. 6) of the probe bar, with the offset carriage 275 still in the central reference position, the tips of the separately disposed probe pairs 44 and 45 are disposed on opposite sides of the tooth 40 to be gauged so that the probe tips are pointed at but spaced by a small distance from the two faces of the gear tooth. When the offset motor 278 is energized, it drives the lead screw 276 to move the offset carriage 275 towards the gear 39 until both members 44 of the probe pair near the offset carriage make contact with the near face of the gear tooth 40.

When motion of the offset carriage 275 is reversed, it passes through its central reference position and beyond to the point where the tips of both members 45 of the far probe pair make contact with the far face of the tooth. Upon this event, the offset carriage 275 is again reciprocated forwardly until it again reaches its central reference position, at which point the motion for the offset carriage 275 is stopped. Finally, the solenoid 295 is deenergized permitting the probe bar 42 to swing downwardly. The downward motion of the probe bar 42 causes the probes 44 and 45 carried thereby to completely clear the teeth 40 of the gear 39 thereby permitting the latter to be turned by the indexing assembly 12 to bring a new gear tooth 40 into gauging position.

The offset motor 278 drives in synchronism with the motion of the offset carriage 275 and through the gear box 277 a rack 300 (Fig. 1) which is securely fastened to a sliding bar 301 constrained by conventional guide means (not shown) to move only endwise. The sliding bar 301 communicates with a recording unit 47 in which it positions in a conventional manner two recording heads 302 and 303 carrying pairs of styli 304 and 305, respectively. The two pairs of styli are electrically coupled by conventional means (not shown) to the near and far pairs of probes 44 and 45, respectively. The recording heads 302 and 303 in response to the motion imparted to them by the sliding bar 301, travel transversely across a record strip 46 of Teledeltos paper or the like in a manner which duplicates but with a magnified ratio the motion of the tips of the probe pairs 44 and 45 with respect to a gear tooth 40 being gauged. When the tip of one of the probes makes contact with a tooth face, a corresponding mark is made by a corresponding stylus upon the Teledeltos paper. By comparing for each tooth the locations of the various marks with preestablished reference points on the record, the deviation of the separate tooth faces or that of the tooth as a whole from preselected tolerance limits may be determined. Further, by comparing the two marks made by a probe pair by contact with its corresponding face the parallelism of the face to the gear axis may be determined. By moving the record strip 46 a longitudinal step for each gauging operation performed, a permanent record of a plurality of gauging operations may be produced which record may be utilized to detect undesirable inaccuracies in the gear 39 being gauged.

The control of the gauging assembly presently disclosed to accomplish the various steps outlined above, may be obtained through an appropriate relay system set in operation by a manual starting switch as, for example, one similar to portions of the relay system disclosed in the patent application of William S. Tandler, et al., Serial No. 118,932, filed September 30, 1949, and entitled "Automatic Absolute Dimension Gauge."

*Manual indexing*

The presently disclosed rotary indexing assembly 12 is adapted to be adjusted to desired index positions either manually or automatically under the control of a record, the record referred to in the present instance being the separate series of indicia formed on the coarse and fine drums, 27 and 28, respectively. Considering first the mode of operation of the indexing assembly 12 for independent indexing, the mechanical steps have already been described whereby the carrier disc 19 is moved forward one step at a time to be locked in position by "walking" pawls at each of a number of principal stations in turn. There remains to be considered the details of a typical control system shown in Fig. 7 which may be used to initiate and govern these mechanical steps. For convenience, the control system is described in a typical sequence of operations.

Figure 7:
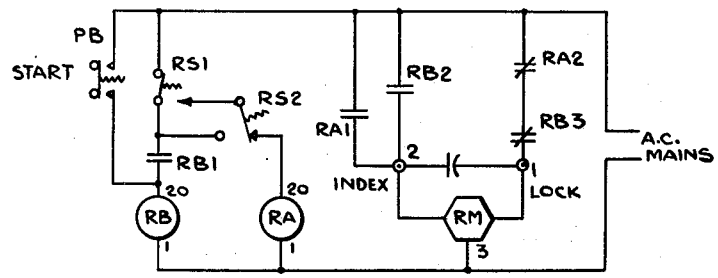
Fig. 7 is a line diagram in schematic form of typical relay circuits that may be utilized in connection with indexing operations between principal stations.
Figure 8:
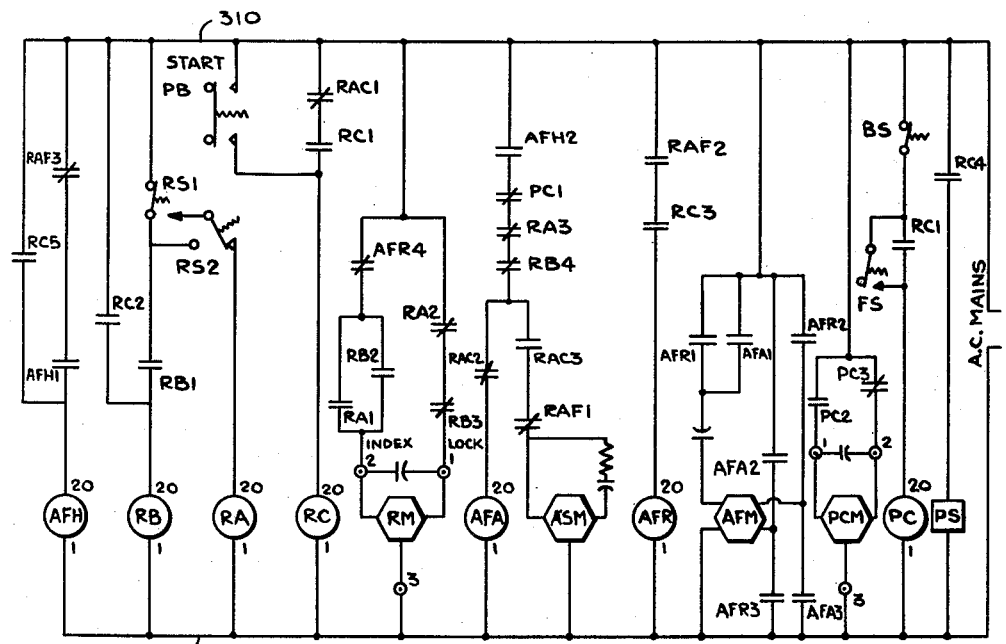
Fig. 8 is a line diagram in schematic form of the alternating current portion of a typical control system of general application in indexing operations with the apparatus shown in Figs. 1–6, inclusive, for adjusting the head to either standard or intermediate index positions.
Figure 9:
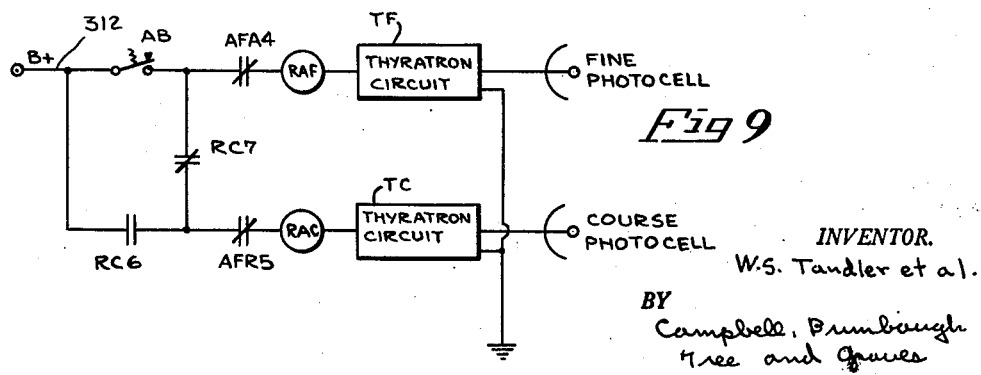
Fig. 9 is a line diagram in the direct current portion of the control system just mentioned.

A convention used in Figs. 7, 8 and 9, is that for a relay winding in an unenergized state, if a set of associated contacts are opened, they are shown open in the figure. However, if a pair of associated contacts are concurrently closed, the contacts are shown with a diagonal bar drawn therethrough to signify their closure. Another convention observed in these figures is that when switch movable contacts are shown schematically as biased by springs, these springs are to be considered in compression so that, in the absence of the depression of a contact button associated with the switch, the movable contacts are maintained in the position to which the compression spring shown would urge them.

Assume now, as before and as shown in Fig. 3, that initially the carrier disc 19 (Figs. 2 and 3) is positioned at a principal station with the pawl 23 locking the carrier disc, the pawl 22 being cammed out to depress the contact button 105 of the microswitch RS2, and reverse torque being applied to the carrier disc. The corresponding initial electrical conditions are shown in Fig. 7 in which the relay windings RA and RB are deenergized and the motor RM is energized through the path including the relay contacts RA2 and RB3. When energized in this manner, the motor RM exerts reverse torque to lock the carrier disc which in turn maintains the motor RM in a stalled condition.

The indexing cycle is commenced by pressing the push button PB momentarily inwardly to bridge the two fixed contacts associated therewith and cause the energization of the relay winding RB. Upon energization of winding RB, the contacts RB1 close with the result that winding RB becomes self-holding through the path including the contacts RB1, the movable contact of the switch RS1 and the left hand fixed contact of the switch RS1. Concurrently, contacts RB3 open and the contacts RB2 close with the result that the motor RM will now be energized in the forward direction.

When the motor RM is energized in the forward direction, the carrier disc rotates clockwise as seen in Fig. 3 as previously described until the pawl 23 is cammed outwardly to depress the contact button of the switch RS1. Upon this event, the movable contact of the switch RS1 (Fig. 7) is moved to the right to engage the right-hand fixed contact of the switch RS1. The change in state of the switch RS1 causes deenergization of the relay winding RB but simultaneously energization of the relay winding RA through the path including the movable and right-hand fixed contacts of the switch RS1, the movable contact of the switch RS2 and the right-hand fixed contact of the switch RS2.

As stated, upon deenergization of the relay winding RB, the contacts RB2 open while the contacts RB3 close. By the simultaneous energization of the relay winding RA, however, the contacts RA1 close while contacts RA2 open. The effect of the opening of contacts RA2 is to continue to maintain open the path through the contacts RA2 and RB3. The effect of the closing of the contacts RA1 is to provide a new path for the energization of the motor RM from the left-hand side as seen in Fig. 7. Accordingly, the net effect of the change in states of the relay windings RA and RB is to leave the mode of energization of the motor RM unaltered.

With the energization of motor RM unaltered by the camming outwardly of the pawl 23, the motor RM will continue to rotate in the forward direction, driving the carrier disc 19 clockwise as seen in Fig. 3 until the locking pawl 22 snaps into position between two adjacent stop pins 52 thereupon releasing the contact button 105 in the switch RS2. When the mentioned button is released, the movable contact of RS2 moves to the left to disengage the right-hand fixed contact of RS2 and to engage the left-hand fixed contact of RS2. Accordingly, the relay winding RA will now become deenergized.

When the relay winding RA is deenergized, the contacts RA1 open while the contacts RA2 are restored to closed condition. As a consequence, electrical energy is now supplied to the right-hand rather to than the left-hand side of the motor RM, causing the motor to run in the reverse direction. This reverse rotation continues until, as previously described, a stop pin 52 engages with the flat face 81 of the pawl 22 to lock the carrier disc 19 and thus to stall the motor RM. The carrier disc 19 is now positioned at a principal station with the pawl 22 rather than the pawl 23 now holding the carrier disc 19 and with the pawl 23 rather than the pawl 22 being cammed outwardly. Concurrently, the conditions initially assumed have been restored in the relay system of Fig. 7 with the exception that the movable contact of the switches RS1 and RS2 are now in engagement with their corresponding right and left-hand fixed contacts, respectively.

For indexing to the next principal station, the relay winding RB is energized as before by manual closure of the contacts of the push button PB. The relay winding again becomes self-holding, but, for the indexing cycle, through the path including the movable and fixed right-hand contacts of the switch RS2. Upon rotation of the carrier disc 19, as a first event the pawl 22 is cammed outwardly causing the movable contact of the switch RS2 to disengage and engage, respectively, its associated left-hand and right-hand fixed contacts. Hence, as in the previous indexing cycle, the relay winding RB is deenergized and the winding RA is energized.

Subsequently, the pawl 23 snaps inwardly causing the movable contact of the switch RS1 to disengage its right-hand contact and to engage the left-hand fixed contact. The carrier disc 19 at this point is again locked at a principal station in the manner originally assumed, with the pawl 23 holding the carrier disc and pawl 22 being cammed outwardly. Concurrently, the electrical system has been restored to the condition originally assumed with the movable contact of the switch RS1 in engagement with its associated fixed left-hand contact and the movable contact of the switch RS2 in engagement with its associated fixed right-hand contact.

It will be seen, therefore, that the electrical system disclosed in Fig. 7, in cooperation with the indexing mechanism 12 shown, enables the index head 17 to be positioned to each of a number of principal stations in turn. Depending upon which of the two locking pawls 22 and 23 holds the carrier disc 19 in place and which one is cammed outwardly, the electrical system may exhibit either one of two quiescent states at the start of an indexing cycle. In either initial state, however, the events of the indexing cycle are substantially the same.

With the electrical system in either of these quiescent states, the carrier disc 19 can be moved from a principal station to an advanced, non-adjacent principal station, without stopping at intervening principal stations, merely by rotating the hand knob 93 (Fig. 4). This moves both of the locking pawls 22 and 23 outwardly so that they clear the stop pins 52 of the carrier disc 19 and cause depression of the contact buttons 105 and 106 of the microswitches RS2 and RS1. The carrier disc, being freed from both of the locking pawls, will thereupon be driven continuously in the clockwise direction, as seen in Fig. 3, until the hand knob 93 is turned to permit one of the locking pawls to snap into place between two adjacent stop pins 52.

It is also apparent that, once the rotary indexing head has been positioned to a standard position corresponding to a principal station, the indexing head may subsequently be moved to intermediate positions by manually rotating the precision lead screw 158 (Fig. 3) through conventional means (not shown) to advance the pawl carriage 24 (Fig. 1) and locking pawls a distance from the reset position, permitting the head to move under the reverse torque of the motor RM to the index position desired. Before indexing the head to another principal station, of course, the pawl carriage should be restored to the reset position by appropriate reverse rotation of the precision lead screw 158.

*Record controlled indexing*

Considering now record controlled indexing of the presently disclosed rotary index head, a general outline will first be given of the various steps which occur in moving the head from one indexed position to another. As a first step, if the last position at which the head 17 has been indexed is an intermediate position, the pawl carriage 24 is first restored to its reset position by reverse rotation of the precision lead screw 158 (Fig. 3) by the fast align motor AFM, the movement of the carriage 24 through the engaging locking pawl 22 or 23 causing the carrier disc 19 to be positioned at the principal station nearest exceeding in value the last assumed index position.

If, in contrast, the last position to which the head 17 has been indexed is a standard position, this first step is omitted. Where the first step is necessary, the motor RM is changed from a reversed energized to a deenergized state to eliminate undue drag during resetting of the pawl carriage. Additionally during the first step, any response of the scanning mechanisms to the indicia on the coarse control drum 27 and on the fine control drum 28 are nullified. This is necessary because the coarse drum 27 in moving synchronously with the carrier disc 19 and the fine drum 28 in rotating with the lead screw 158 cause the indicia for the old index position to pass under the coarse and fine drum scanners, respectively, generating signals that might cause false indexing.

When the pawl carriage 24 has been returned to its reset position, as a second step the carrier disc 19 is advanced forwardly by the motor RM through one or more principal stations in a manner substantially similar to that previously described for manual indexing of the rotary head 17. The forward motion of the carrier disc 19 continues until the coarse indicium 145 for the new index position is detected by the coarse drum photocell 146. This coarse indicium is positioned on the scanned path of the coarse drum 27 between the points representing respectively the exact index position desired and the nearest principal station of greater angular displacement. The coarse indicium 145, however, lies much closer to the former, the spacing between them representing a distance less than that traveled by the carrier disc 19 for a single revolution of the lead screw 158. The coarse indicium 145 thus approximates the location of the desired index position.

When, as stated, the coarse indicium 145 has been detected by the coarse drum photocell 146, a signal is produced indicating that the carrier disc 19 is to be positioned at the following principal station. Accordingly, the forward motion of the disc 19 continues to a point slightly ahead of the station when, in the manner previously described, the rotation of the motor RM is reversed to bring the disc into standard position.

When this standard position is reached, as a third step, the fast align motor AFM is energized in the forward direction to drive through the precision lead screw 158 the pawl carriage 24 from its reset position towards the carrier disc 19 to cause offsetting of the same in a retrograde direction. The action so continues until, as a result of the reverse motion of the coarse drum 27 moving synchronously with the carrier disc 19, the coarse indicium 145 for the desired index position is detected by the coarse drum photocell 146 for the second time. A signal is thereupon produced causing the slow align motor ASM to take over the drive of the precision lead screw 158 from the fast align motor AFM.

Meanwhile, as a fourth step, the fine drum scanner base 207 (Fig. 2) has been advanced by a full registering motion to bring the aperture 212 of the photocell 209 and the lamp 215 in registry with the peripheral line 193 on the fine drum 28 containing the fine indicium 192 representing the new index position desired. If, in a cyclical preselected sequence of index positions, the scanner base 207 has previously reached the limit of its forward travel, the assembly will be recycled in the manner previously described to register with the first peripheral line 193 of the fine drum.

It will be recalled that the coarse indicium 145 is located on the coarse drum 27 between the point representing the exact desired index position and the point representing the standard position from which the offset is taken, but within one revolution of the precision lead screw 158 from the former point. Consequently, the coarse indicium 145, as far as offset is concerned, may be considered to represent the number of required whole revolutions for the lead screw, the remaining fraction of a revolution to complete the required offset being indicated by the indicium 192 on the fine drum 28.

The fine indicium 192 represents this left-over fraction by virtue of its angular displacement on the fine drum 28 from a reference position 194 (Fig. 3) on the same. Expressed in another way, it represents the correction to be added to the approximate index position given by the coarse indicium. Hence, in order to position exactly the carrier disc 19 as desired, as a fifth and final step, the slow align motor ASM continues at a slow speed the rotation of the precision lead screw causing the appropriate peripheral line on the fine drum 28 to travel past the aperture 212 until the photocell 209 detects the fine indicium 192. Thereupon a signal is produced which arrests the motion of the precision lead screw 158 and collaterally that of the carrier disc 19. The carrier disc 19 is now positioned to the exact index position desired.

Typical control circuits for accomplishing the above-described operations are illustrated in Figs. 8 and 9 in which the above-noted conventions are employed. The various components of Figs. 8 and 9 are best understood in terms of their operative effects. Consequently, the various steps for indexing the rotary head 17 by record control will now be considered. As a matter of convenience, the index head 17 is initially assumed to be at a standard position corresponding to a principal station.

Referring now to Figs. 8 and 9, the figures show, respectively, two alternating current power lines 310, 311 (Fig. 8), and a direct current supply line 312 (Fig. 9) furnishing a voltage with respect to ground, the lines in both figures being adapted for energizing the components associated therewith and shortly to be described. Initially, the relay system is in the condition shown. The carrier disc 19 is assumed to be locked by the pawl 23 (Fig. 3) while the pawl 22 is cammed outwardly to depress the button of the switch RS2 (Figure 2). The pawl carriage 24 is assumed to be at its reset position with its actuator block 160 depressing the button 161 of the switch AB (Fig. 9). All of the relay windings are de-energized. The motor RM (Fig. 8) is energized in the reverse direction through the contacts RA2 and RB3 to be stalled by the locking of a stop pin 52 on the carrier disc with the pawl 23. The motor PCM is energized through the contacts PC3, to be stalled by the locking of an escapement pin 232 (Fig. 4) in the peripheral row 230 on the escapement drum 229 with the escapement lever 233. The fast align motor AFM and the slow align motor ASM are deenergized.

To initiate the indexing cycle, the push button PB is depressed so that its movable contact bridges its two fixed contacts. The relay winding RC is thereupon energized to become self-holding through the contacts RC1 and RAC1.

When the relay winding RC is energized, by the closing of the contacts RC2 the relay winding RB is energized. Upon this event, the relay contacts RB2 and RB3 close and open, respectively, so that current is now furnished to the left-hand side of the motor RM to drive it in the forward direction. This causes the carrier disc 19 to move clockwise in Fig. 3, in the manner previously described for independent indexing of the carrier disc 19. It will be noted that, since the relay winding RB2 is energized through the closed contacts RC2, as long as the relay winding RC is energized, the relay winding RB will remain energized. Hence, as long as the winding RC is energized, the motor PM will run in the forward direction independent of the opening and closing of the switches RS2 and RS1 by the locking pawls 22 and 23.

When the winding RC is energized, the closure of the contacts RC4 energizes the rotary solenoid PS to move the escapement lever 233 (Fig. 4) to change registry from the peripheral row 230 to peripheral row 231 of escapement pins 232 on the escapement drum 229. As a consequence, as previously described, the scanner base 207 will be moved forwardly half of its total advance for an indexing cycle.

If it so happens that immediately antecedently the lamp 215 and the aperture 212 of the fine drum scanner have been in registry with the last peripheral line 193 on the fine drum, the actuator block 265, during the forward motion by the scanner base will strike the button 262 of the switch FS on the scanner base. As a consequence, the scanner base 207 will be, as previously described, recycled in position to the start of its line of travel. This recycling action is caused by the relay system as follows:

Upon the botton 262 of switch FS being actuated, the contacts of the switch FS close to energize the relay winding PC. The winding PC thereupon becomes self-holding through the path including the contacts of switch BS and the contacts PC1. When the winding PC is energized, the contacts PC2 and PC3 close and open, respectively, to reverse the direction of rotation of the motor PCM. As a consequence, in the manner previously described, the escapement drum 229 rotates freely in the reverse direction past the escapement lever 233 causing simultaneous backwards rotation of the scanner base 207 along its line of travel. The actions just described continue until the scanner base is restored to the start of its line of travel when the actuator block 264 strikes the button 261 of the switch BS on the scanner base.

The contacts of switch BS are thereupon opened to deenergize the winding PC in turn to restore the flow of current in the motor PCM by the opening and closing of the contacts PC2 and PC3, respectively. The escapement drum 229 in consequence, in the previously described manner, again becomes locked by the escapement lever 233 so that the scanner base 207 is positioned upon the deenergization of the solenoid PS to register with the first peripheral line 193 on the fine drum 28.

Finally, when the relay winding RC becomes energized, the contacts RC5 close to energize the winding AFH which thereupon becomes self-holding through the contacts AFH1 and RAF3. Also the contacts RC6 close to condition the circuit for the relay winding RAC so that when a coarse indicium 145 is detected by the photocell 146 of the coarse scanner, the winding RAC will become energized.

The indexing assembly is now in a condition where the carrier disc 19 is being advanced clockwise, as seen in Fig. 3, by the motor RM. This condition continues until the photocell 146 of the coarse scanner detects the coarse indicium 145 representing the next desired index position. The photocell thereupon produces a signal which fires a thyratron TC (Fig. 9) having its plate-cathode space in the circuit of relay winding RAC. As is well known, the thyratron TC when once fired will continue conducting until its plate-cathode circuit is interrupted. Since the contacts RC6 are at this time closed, the winding RAC becomes energized through the circuit including the contacts RC6, the contacts AFR5 and the thyratron TC. The energization of the winding RAC causes the contacts RAC1 (Fig. 8) to open to deenergize the relay winding RC. When the relay winding RC is deenergized, the contacts RC6 open to deenergize the relay winding RAC and to extinguish the thyratron TC.

Upon deenergization of the relay winding RC the contasts RC4 open to deenergize the rotary solenoid PS to cause the escapement lever 233 (Fig. 4) to shift registry from the peripheral pin row 231 to the peripheral pin row 230 on the escapement drum 229. Accordingly, as previously described, the scanner base 207 moves forwardly to complete its advance for the indexing cycle. The photocell aperture 212 and the lamp 215 of the fine drum scanner unit are now in registry with the peripheral line 193 for the desired index position.

Also, upon the deenergization of the relay winding RC (Fig. 8), the contacts RC2 will open so that electrical energy can no longer be fed to the relay winding RB through these contacts. In spite of the opening of the contacts RC2, however, one or the other of the windings RB and RA will stay energized through one of the possible switching states of the switches RS1 and RS2 described above. In such case, the right-hand path to the motor RM through the contacts RA2 and RB3 will still remain open while one of the left-hand paths through the contacts RA1 or RB2 will still be closed with the result that the motor RM will continue to rotate in the forward direction. Hence, the carrier disc 19 will be driven past the point represented by the coarse indicium 145 until it reaches a principal station.

When the carrier disc moves slightly beyond this principal station, in the manner previously described for manual indexing, which ever of the windings RA and RB is still energized now becomes deenergized. Consequently, the remaining closed one of the contacts RA1 and RB2 will be opened while the remaining open one of the contacts RA2 and RB3 will be closed with the result that the direction of rotation of motor RM is reversed to lock the carrier disc 19 with whichever of the locking pawls is inwardly positioned at that time. Hence, at this juncture the carrier disc 19 is adjusted to a standard position at a principal station.

At the same time that the carrier disc 19 is moved to a standard position, however, since both of the relay windings RA and RB are deenergized, both of the contacts RA3 and RB4 will be closed. The contacts AFH2 will also be closed since the relay winding AFH as described is holding itself energized. The contacts PC1 will either be closed or will shortly close as soon as the fine drum scanner base 207 has recycled to the start of its line of travel. Hence, a closed path is established through the mentioned contacts and the contacts RAC2 to the relay winding AFA. Accordingly, the winding AFA becomes energized.

When the winding AFA is energized, the contacts AFA1, AFA2 and AFA3 close to provide a current path for the fast align motor AFM and the brake associated therewith. Energization of the brake releases the motor AFM which thereupon starts to drive the pawl carriage 24 from its reset position towards the carrier disc 19. Concurrently, the contacts AFA4 open to prevent the relay winding RAF from being energized as a result of undesired detections by the fine drum scanner of the fine indicium 192 for the desired index position.

When the pawl carriage 24 moves from the reset position, the actuator block 160 (Fig. 2) releases the button 161 of the switch AB, the contacts of which in turn close. As a result, a new closed path is established for the relay winding RAC through the contacts of the switch AB and the contacts RC7, the thyratron TC being the only remaining open section of the path.

As previously described, as the pawl carriage 24 moves towards the carrier disc 19, the latter is offset from its standard position, the disc being driven by the reverse torque of the motor RM to follow and remain in engagement with the inwardly positioned locking pawl. Concurrently, the coarse drum 27 is being driven by the motor RM in the reverse direction. As a result, the coarse indicium 145 for the desired index position passes by the coarse drum scanner unit for the second time.

When the coarse indicium 145 is detected, the coarse drum scanning photocell 146 produces a signal which, as before, fires the thyratron TC to complete the current path for the relay winding RAC, which thereupon is energized. Upon energization of the winding RAC, the contacts RAC2 open to deenergize the relay winding AFA with the result that, first, the contacts AFA4 close to condition the relay winding RAF for energization, and second, the contacts AFA1, AFA2 and AFA3 open to cut off the flow of current to the fast align motor AFM and its brake. Deenergization of the brake arrests the motion of the motor and locks its shaft in place. Additionally, energization of the relay RAC completes a path through the contacts AFH2, PC1, RA3, RB4, RAC3 and RAF1 to furnish current to the slow align motor ASM and its associated electromagnetic clutch and gear shift device. Upon reception of current, motor ASM is energized to its drive condition while the clutch and gear shift are energized, as described, to respectively uncouple and couple motors AFM and ASM for driving of the precision lead screw 158. The motor ASM, accordingly, takes over from the motor AFM the driving of the precision lead screw 158 which is moving the pawl carriage 24. Meanwhile, the thyratron TC continues to remain energized.

The slow align motor ASM continues to drive the precision lead screw 158 at a slow speed until the fine indicium 192 for the desired index position is detected by the photocell 209 of the fine drum scanner. The photocell 209 thereupon produces a signal which is applied in a conventional manner to fire a thyratron TF having its plate-cathode space in the current path for the relay winding RAF. Once the thyraton TF is fired it continues to conduct. The conduction of the thyratron TF completes the current for the relay winding RAF so that the same is energized.

When the relay RAF is energized, the contacts RAF3 open to deenergize the relay winding AFH. Concurrently, the contacts RAF2 close to condition the relay winding AFR for energization. Finally, the contacts RAF1 open to cut off the flow of current to the slow align motor ASM to terminate the motion of the same, this current cut-off also deenergizing the electromagnetic clutch and gear shift to cause it to respectively decouple and couple, as described, the motors ASM and AFM for driving of precision lead screw 158. The thyratron TF remains energized.

With the termination of motion of the motor ASM, the carrier disc 19 has been located with a high degree of precision at the desired index position represented by a paired coarse indicium 145 on the coarse drum 27 and fine indicium 192 on the fine drum 28. At this time, the pawl carriage 24 has been moved by the proper amount from its reset position with the collateral result that the contacts of the switch AB are closed. Both relay windings RA and RB are deenergized. The motor RM, which is receiving current through the contacts RA2 and RB3, exerts reverse torque on the carrier disc 19 to urge it counterclockwise, as seen in Fig. 3. This torque causes locking of the carrier disc 19 at the desired position by an engagement under force of one of the stop pins 52 with one of the locking pawls 22 or 23.

The motor PCM is energized through the contacts PC3 to lock the escapement drum 229 against the escapement lever 233 to position the scanner base 207 at the peripheral line for the newly assumed index position. The relay windings RC, AFH, AFA, AFR and PC, the rotary solenoid PS and the align motors AFM and ASM are all deenergized. The relay windings RAC and RAF remain in an energized condition since no change has occurred in the systems to extinguish the thyratrons respectively associated therewith.

The carrier disc 19 and rotary head 17 are now indexed to an intermediate index position rather than the initially assumed standard position.

While in this position, the gear tooth 40 positioned between the pairs of probes 44 and 45 is automatically gauged, a record being made on the Teledeltos strip 46.

In order to initiate a new indexing cycle starting with the intermeidate position noted above, the push button PB is moved inwardly to bridge its fixed contacts as before to thereby reenergize the relay winding RC.

When the relay winding RC is energized, the contacts RC2 close to energize the relay winding RB which, in turn, among other effects, causes opening of the contacts RB3. Further, the contacts RC4 are closed to energize the rotary solenoid PS which, in the previously described manner causes the fine drum scanner base 207 (Fig. 2) to move half-way forward through the total advance for the new indexing cycle.

Additionally, the contacts RC5 (Fig. 8) are closed to energize the relay winding AFH.

As the most important effect, upon the energization of relay winding RC however, the contacts RC3 are closed. Since the relay winding RAF is still energized to maintain contacts RAF2 closed, the relay winding AFR will be energized through the path including the contacts RC3 and RAF2.

As a first effect, when the relay AFR is energized, the contacts AFR5 open, causing deenergization of relay winding RAC and the thyratron TC. When the relay RAC is deenergized, the contacts RAC1 close so that winding RC now becomes self-holding through the contacts RAC1 and RC1.

As a second effect when AFR is energized, the contacts AFR4 are opened. Since, as stated, the contacts RB3 have previously been opened, no current can reach the motor RM either along the path through RB3 or the path through AFR4 with the result that the motor RM is temporarily completely deenergized and exerts no torque.

As a third effect when the relay AFR is energized, the contacts AFR1, AFR2 and AFR3 close to furnish current to the fast align motor AFM, causing it to rotate in the reverse direction (the brake for motor AFM being simultaneously energized to release the motor). As a consequence, the motor AFM through the precision lead screw 158 drives the pawl carriage 24 away from the carrier disc 19 and towards its reset position. In its movement, the pawl carriage 24 through the engaged locking pawl, pulls along the carrier disc 19 in the clockwise direction, as seen in Fig. 3. Since the motor RM is now deenergized, the carrier disc 19 offers little resistance to the motion imparted to it by the pawl carriage.

The fast align motor AFM drives the pawl carriage 24 as described until the same reaches the reset position, while concurrently, the carrier disc 19 is brought to the standard position from which it was lately offset. Upon this event, the actuator block 160 carried by the pawl carriage 24 strikes the button 161 of the switch AB causing the switch contacts to open to thereupon cause deenergization of the relay winding RAF and the thyratron TF.

When the relay RAF is deenergized, the contacts RAF3 close permitting the relay AFH to become self-holding. Also, when the winding RAF is deenergized the contacts RAF2 open to deenergize the winding AFR. The deenergization of the winding AFR by movement of the various contacts associated therewith removes power from the motor AFM and from its brake, causing the brake to arrest the motion of the motor. Deenergization of winding AFR also conditions the winding RAC for subsequent energization and lastly restores current to the motor RM through the contacts RB2 so that the motor RM again exerts a torque to drive the carrier disc 19 clockwise, as seen in Fig. 3.

It will be seen that at this phase of the second indexing cycle, conditions both in the mechanical components of the indexing assembly and in the electrical system have been restored to those existing in the first described indexing cycle just after the relay winding RC was first energized. Accordingly, the remainder of the second indexing cycle will be carried out in exactly the same manner as that described for the first indexing cycle.

With respect to the relay system of Figs. 8 and 9 the following additional features should be noted. First, when the relay winding RC is energized it closes a pair of contacts (not shown) to shunt a condenser (not shown) across the relay winding RAC to delay the same. If a coarse drum indicium, scanned just before a presently considered indexing cycle, has been located at or near a principal station so that, upon return of the pawl carriage 24 to its reset position, the coarse drum scanning unit still sees a portion of this earlier cycle indicium, the delay induced in the reaction of the winding RAC prevents the system from falsely responding in the presently considered cycle to the indicium of the antecedent cycle.

Second, it is apparent that by cross connection between the relay systems of Figs. 8 and 9 and the relay system controlling the operation of the gauging mechanism that an entire sequence of alternating indexing and gauging operations may be made fully automatic.

A type of cross connection which accomplishes this result comprises a first relay winding (not shown) in the relay system for the offset motor 278 which, when actuated in response to a signal indicating the completion of a gauging operation, closes a pair of contacts (not shown) to provide a shunt path around the manually operated switch PB and a second relay winding in the system of Figs. 8 and 9, for example relay winding RAF, which is actuated upon completion of an indexing operation to close a pair of contacts which provide a shunt path around the starter switch for the relay system for the offset motor 278. Hence it is obvious that the completion of each indexing operation induces a subsequent gauging operation and conversely so that an entire preselected sequence of both indexing and gauging operations may be run through without the intervention of a human operator. Of course, the step by step longitudinal motion of the record strip may be synchronized in a conventional manner with the actions of the indexing and gauging assemblies so that during each indexing operation the record strip is advanced one step to preserve over the preselected sequence a record of each of the gaugings performed.

Fig. 10 shows a modified structure for a pawl tooth 77a which has been found desirable to prevent binding of, say pawl 22, upon engagement and disengagement with the stop pins 52 and radially adjustable screws 55. In Fig. 10 a section is cut away from the upper part of the tooth, the section being taken first downwardly along the pawl plane and then outwardly from the tooth to form an outer shoulder 315 on the same. This outer shoulder or crown 315 which is shaped slightly convex upwards is adapted to contact the adjustable screws 55 to determine the inner travel limit for the pawl. The portion of the tooth left behind upon removal of the mentioned section forms an upwardly projecting tip 316 adapted to pass inside the adjustable screws 55 upon engagement of the same with the mentioned shoulder. The rear face of this projecting tip represents a continuation of the inclined vernier face 81 which positions the carrier disc in dependence on the amount of pawl extension towards the carrier disc axis. As a further measure to prevent binding, a small part of the rear part of the shoulder and of the tooth below the same is cut away to form a taper 317 for the shoulder from the rear face of the tooth.

It will be understood from the foregoing description that the invention provides a novel and highly effective apparatus for obtaining precision rotary indexing, for moving the index head from one desired position to another, either manually or automatically under record control, and for gauging a work piece after it has been so indexed. Obviously, the indexing assembly and the gauging assembly may be separately useful. It is evident also that many variations may be made within the spirit of the invention of the presently disclosed embodiment.

The embodiment described above and illustrated in the drawings is intended to be merely illustrative, and is not to be regarded as restricting in any way the scope of the following claims.

We claim:

1. In high precision indexing mechanism for positioning an element, the combination of a circular carrier means rotatable about an axis for positioning said element selectively to a plurality of stations, a first circular array of axially projecting stop pins fixedly mounted on said carrier means to represent the approximate locations of said stations, pivoted pawl means disposed substantially tangentially of said carrier means and carrying at its free end a tooth projecting towards the axis of said carrier means, said pawl means being movable from a position in which the tooth thereof lies outside the path of said first stops to a position in which said tooth is caused to enter the space between two adjacent axial stop pins, an engagement face upon said tooth inclined with respect to an intersecting radius from said axis, and adapted as said tooth enters said space in engagement with one of said two axial stop pins to position said carrier means at angular locations in a range including the location of the station represented by the engaged stop pin, and a circular array of radially extending stop pins on said carrier means, one for each axial stop pin, said radial stop pins limiting the advance of said tooth into said space to cause exact positioning of said carrier means to a desired station, upon simultaneous engagement of said tooth with an axial stop pin and a corresponding radial stop pin 2. In high precision indexing mechanism for positioning an element selectively to a plurality of stations, the combination of circular carrier means rotatable about an axis for displacing said element, a circular array of first stop means fixedly mounted on said carrier means to represent the approximate locations of said stations, a circular array of second stop means adjustably mounted on said carrier intermediate adjacent ones of said first stop means and each representing by its adjustment a correction corresponding to the deviation of the approximate location of an associated first stop means from the actual location of the station represented thereby, pawl means adapted for separate engagement with each separate first stop means and for engagement simultaneously with the associated second stop means, the engagement position of said pawl means with the first stop means being selectively determined, under the said simultaneous engagement condition, by the adjustment of the second stop means whereby, when the second stop means is adjusted as described to represent said deviation, said pawl means engages the first stop means to position said carrier means exactly to a desired station, and reversible torque means for advancing said carrier means and for maintaining said pawl means in engagement with a selected first stop means under force.

3. In high precision indexing mechanism for positioning an element, the combination of a circular carrier rotatable about an axis for positioning said element selectively to a plurality of stations, a plurality of stop means circumferentially mounted in spaced apart relation on said carrier and representing the locations of a corresponding plurality of principal stations, pawl means normally disposed at a reference location to lie substantially tangentially of said carrier means, said pawl means being selectively movable, while at its reference location, from a position out of the path of said stop means to a position between two adjacent stop means, and means for shifting said pawl means from its reference location tangentially of said carrier to position the latter at selected stations intermediate said principal stations.

4. In high precision indexing mechanism for positioning an element, the combination of a circular carrier rotatable about an axis for positioning said element selectively at a plurality of stations, a plurality of stop means circumferentially mounted in spaced apart relation on said carrier means and representing the locations of a corresponding plurality of principal stations, pawl means normally disposed at a reference location to lie substantially tangentially of said carrier, said pawl means being selectively movable, while at its reference location, from a position outside the path of said stop means to a position between two adjacent ones of said stop means, reversible torque means effective forwardly to drive said carrier means from one station to another and reversely to maintain a selected one of said stop means in engagement with said pawl means under force, and means for shifting said pawl means from its reference location tangentially of said carrier to position the latter selectively at desired stations intermediate principal stations.

5. In high precision indexing mechanism for positioning an element, the combination of circular carrier means rotatable about an axis for positioning said element selectively to a plurality of stations, a circumferential array of stop means mounted upon said carrier means and representing the locations of corresponding principal stations, pawl carriage means spaced away from said carrier means at a reference location and tangentially of said carrier means, pawl means pivotably supported by said carriage and disposed to cooperate with said stop means to position said carrier means at corresponding principal stations, reversible torque means effective forwardly to drive said carrier and reversely to engage a selected one of said stop means under force, and adjustable means for shifting said carriage means tangentially of said carrier means to position the latter to selected stations intermediate said principal stations.

6. In high precision indexing mechanism for positioning an element selectively to a preselected sequence of index positions, the combination of movable means for displacing said element, record means bearing indicia representing said index positions in said preselected sequence, first means responsive to said indicia for positioning said movable means to predetermined and exactly located principal stations, and second means responsive to said indicia for precisely offsetting said movable means from said principal stations to said index positions.

7. In high precision indexing mechanism for positioning an element selectively to a preselected sequence of index positions, the combination of movable means for displacing said element, engaging means normally disposed at a reference location for engagement with said movable means to position the same to a plurality of predetermined and exactly located principal stations, record means bearing indicia representing said index positions in said preselected sequence, first means responsive to said indicia for positioning said movable means to said principal stations, and second means responsive to said indicia for shifting said engaging means from said location to offset said movable means from said designated principal stations by predetermined amounts as required to position said movable means selectively at said index positions.

8. In high precision indexing mechanism for positioning an element selectively to a preselected sequence of index positions, the combination of rotatable carrier means, a circular array of stop means mounted on said carrier means to represent exactly the locations of a plurality of predetermined principal stations, pawl means normally disposed at a reference location for selective engagement with said stop means to position said carrier means at corresponding principal stations, record means bearing indicia representing said index positions in said preselected sequence, first means responsive to said indicia for positioning said carrier means to said principal stations, second means responsive to said indicia for shifting said pawl means from said location to offset said carrier means from said designated principal stations by amounts also designated by the indicia for exactly positioning said carrier means to the indicated index positions.

9. In high precision indexing mechanism for positioning an element selectively to a preselected sequence of index positions, the combination of rotatable carrier means for displacing said element, a plurality of stop means circumferentially mounted on said carrier means and representing the locations of a corresponding plurality of principal stations, pawl means normally disposed at a reference location substantially tangentially of said carrier means, said pawl means being individually engageable with said stop means to position said carrier means selectively at principal stations, first motor means to drive said carrier means to designated principal stations, second motor means for displacing said pawl means from said reference location to shift said carrier means from the designated principal stations by designated offsets therefrom, record means bearing indicia representing said index positions in said preselected sequence and designating for each index position a principal station and an amount of offset therefrom, and means responsive to said indicia for energizing said first and second motor means to effect by their stated actions exact positioning of said head to said index positions.

10. In high precision indexing mechanism for positioning an element in accordance with a preselected sequence of index positions, the combination of rotatable carrier means for displacing said element, a plurality of stop means circumferentially mounted on said carrier means and representing the locations of corresponding principal stations, pawl means normally disposed at a reference location and tangentially of said carrier means, said pawl means being selectively adaptable for individual engagement with said stop means to position said carrier means at corresponding principal stations and for disengagement with said stop means to permit driving of said carrier means through an indefinite number of principal stations, reversibly energizable torque means effective forwardly to drive said carrier and reversely to lock separate ones of said stop means against said pawl means under force, motor means for selectively shifting said pawl means tangentially of said carrier means to cause positioning of the latter to stations intermediate said principal stations, a first record bearing first indicia representing to approximations the index positions in said preselected sequence, a second record bearing second indicia representing corrections related to the deviation of the approximate locations of said index positions from their actual locations, means responsive to said first indicia for energizing said torque means forwardly to drive said carrier means to the next principal station past an indicated index position and thereafter reversing said torque means, means also responsive to said first indicia for energizing said motor means to cause first shifting of said pawl means to position said element approximately at said indicated index position, and means responsive to said second indicia for energizing said motor means to cause further shifting of said pawl means to position said element exactly at said indicated index position.

11. In high precision indexing mechanism, the combination of a member movable in a path and adapted to be exactly positioned to a plurality of stations in said path, a plurality of indexing stops disposed along said path to represent approximately the positions of said stations, pawl means selectively engageable with each separate indexing stop through a selected range of engagement positions distributed in inclined relation to a normal to said path to correspondingly position said member through a different range of locations in said path for each indexing stop, each such range of locations in said path including the station represented by the engaged indexing stop, one of said plurality of indexing stops and said pawl means being carried by said member, and a plurality of limit stops each disposed along said path adjacent an associated indexing stop and carried by the same element as the last-named indexing stop to be adjustable in position relative to the associated indexing stop, each limit stop being disposed relative to said pawl means when engaged with the associated indexing stop to be adapted by selective adjustment of the limit stop to selectively intercept said pawl means at any engagement position thereof in said range of engagement positions, each limit stop being thereby adapted by selective adjustment thereof to establish a limiting engagement position of the pawl means and associated indexing stop which, when assumed, will establish said member as exactly positioned to station.

12. In high precision indexing mechanism, the combination of a member movable in a path and adapted to be exactly positioned to a plurality of stations in said path, a plurality of indexing stops disposed along said path to represent approximately the positions of said stations, pawl means selectively engageable with each separate indexing stop through a selected range of engagement positions distributed in inclined relation to a normal to said path to correspondingly position said member through a different range of locations in said path for each indexing stop, each such range of locations in said path including the station represented by the engaged indexing stop, one of said plurality of indexing stops and said pawl means being carried by said member, and a plurality of limit stops each disposed along said path adjacent an associated indexing stop and carried by the same element as the last-named indexing stop to be adjustable in position relative to the associated indexing stop by adjustment in a given direction of the limit stop, each limit stop having a stop surface disposed substantially normal to the direction of adjustment thereof and adapted to intercept said pawl means, and each limit stop being disposed relative to said pawl means when engaged with the associated indexing stop to present said surface at different positions to said pawl means in accordance with selective adjustment of said limit stop so as to selectively intercept said pawl means by said surface at any engagement position thereof in said range of engagement positions, each limit stop being thereby adapted by selective adjustment thereof to establish a limiting engagement position of the pawl means and associated indexing stop which, when assumed, will establish said member as exactly positioned to station.

13. In high precision indexing mechanism, the combination of a member movable in a path and adapted to be exactly positioned to a plurality of stations in said path, a plurality of indexing stops carried by said member and disposed along said path to represent approximately the positions of said stations, pawl means selectively engageable with each separate indexing stop through a selected range of engagement positions distributed in inclined relation to a normal to said path to correspondingly position said member through a different range of locations in said path for each indexing stop, each such range of locations in said path including the station represented by the engaged indexing stop, and a plurality of limit stops adjustably carried by said member and disposed along said path to each be adjacent an associated indexing stop and to each be adjustable in position relative to the associated indexing stop, each limit stop being disposed relative to said pawl means when engaged with the associated indexing stop to be adapted by selective adjustment of the limit stop to selectively intercept said pawl means at any engagement position thereof in said range of engagement positions, each limit stop being thereby adapted by selective adjustment thereof to establish a limiting engagement position of the pawl means and associated indexing stop which, when assumed, will establish said member as exactly positioned to station.

14. A combination as in claim 13 wherein said member is a circular member adapted to move in a circular path by rotation thereof about an axis, and wherein said plurality of indexing stops and plurality of limit stops are each disposed in a circular row on said circular member.

15. In high precision indexing mechanism, the combination of a member movable along a first predetermined path and adapted to be displaced selectively to a plurality of stations, a row of indexing stops spaced along said path to represent the approximate positions of said stations, pawl means reciprocably movable in a second path transverse to said first path from a position outside said indexing stops to a position between two adjacent indexing stops, for engagement with one of the same, one of said plurality of indexing stops and said pawl means being carried by said member, an engagement face on said pawl means which is inclined to said second path and which is adapted, as it enters the space between two adjacent indexing stops in engagement with one of said two indexing stops to position said member through a selected range of locations in said first path including the location of the station represented by the engaged indexing stops, and a row of limit stops disposed along said path intermediate said indexing stops and carried by the same element as said indexing stops to each be adjacent an associated indexing stop and to be adjustable in position relative to the associated indexing stop by adjustment of the limit stop in the direction of said second path, each limit stop being disposed relative to said pawl means when engaged with the associated indexing stop to be adapted by selective adjustment of the limit stop in said direction to selectively intercept said pawl means at any engagement position thereof in said range of engagement positions, each limit stop being thereby adapted to selectively limit the advancement of said pawl means into the spaces between two adjacent indexing stops to an advancement which, when the pawl means is engaged with the associated indexing stop, establishes said member as exactly positioned to station.

16. In high precision indexing mechanism, the combination of a member movable in a path, a plurality of stops disposed on said member in spaced relation along said path to represent the locations in said path of a plurality of stations for said member, pawl means having an engaging head and movable at said head transversely of said path back and forth from a position permitting movement of said stops past said head in the course of movement of said member in said path to a position interposing said head between a stop to be engaged by said head and an adjacent stop, means to move said member in said path to bring a selected stop in proximity to said head in a position permitting engagement of the selected stop by said head, a carriage for said pawl means, means mounting said carriage to permit linear movement thereof in a plane which includes said path and to permit corresponding substantially linear movement of said pawl means through a selected range of positions including a reference position and other positions at which said pawl means, when the head thereof is engaged with said selected stop, will respectively establish said member as positioned at the principal station represented by the selected stop and at auxiliary stations lying between the last-named principal station and the next adjacent principal station, and means to shift said carriage on said mounting means in an amount corresponding to a predetermined displacement of said pawl means from said reference position.

17. A combination as in claim 11 wherein said indexing stops are in the form of pins extending normal to both said path and to the locus of said positions of said pawl means at which said pawl means is engageable with said pins, and said limit stops are in the form of screw elements which respectively extend towards said pawl means and which, by rotation thereof, are selectively adjustable in position towards and away from said pawl means.

References Cited in the file of this patent

UNITED STATES PATENTS

| | | |
|---|---|---|
| 766,828 | Johnson | Aug. 9, 1904 |
| 1,474,438 | Muller | Nov. 20, 1923 |
| 1,961,925 | Drader | June 5, 1934 |
| 2,295,209 | Fraumann et al. | Sept. 8, 1942 |
| 2,421,327 | Hallowell | May 27, 1947 |
| 2,446,865 | Barnes | Aug. 10, 1948 |
| 2,565,787 | Tennant | Aug. 28, 1951 |
| 2,709,932 | Grimes | June 7, 1955 |

FOREIGN PATENTS

| | | |
|---|---|---|
| 38,579 | France | Mar. 24, 1931 |

(Addition to No. 700,792)